(12) United States Patent
Pfister

(10) Patent No.: US 7,243,892 B2
(45) Date of Patent: Jul. 17, 2007

(54) ARTICULATED MOUNT

(75) Inventor: Joel W. Pfister, Shorewood, MN (US)

(73) Assignee: CSAV, Inc., Savage, MN (US)

( * ) Notice: Subject to any disclaimer, the term of this patent is extended or adjusted under 35 U.S.C. 154(b) by 0 days.

(21) Appl. No.: 10/750,707

(22) Filed: Jan. 2, 2004

(65) Prior Publication Data

US 2004/0159757 A1    Aug. 19, 2004

Related U.S. Application Data

(60) Provisional application No. 60/438,965, filed on Jan. 9, 2003.

(51) Int. Cl.
*A47G 29/00*        (2006.01)

(52) U.S. Cl. .............. 248/371; 248/281.11; 248/917; 248/919; 403/52; 403/72; 403/73; 403/119

(58) Field of Classification Search ........... 248/281.11, 248/922, 923, 371, 284.1, 291.1, 292.13; 403/109.4, 119, 120, 52, 72, 73; 16/273; 384/571

See application file for complete search history.

(56) References Cited

U.S. PATENT DOCUMENTS

| | | | | |
|---|---|---|---|---|
| 2,986,395 | A | * | 5/1961 | Sheftel ..................... 473/483 |
| 3,409,315 | A | * | 11/1968 | Wichers et al. .......... 285/153.3 |
| 3,601,598 | A | * | 8/1971 | Horn ......................... 362/418 |
| 4,516,751 | A | | 5/1985 | Westbrook |
| 4,720,198 | A | * | 1/1988 | DeBruyn ................... 384/246 |
| 4,877,164 | A | * | 10/1989 | Baucom .................... 224/544 |
| 4,882,959 | A | * | 11/1989 | Sakai ........................ 81/416 |
| 4,989,813 | A | | 2/1991 | Kim et al. |
| 5,075,929 | A | * | 12/1991 | Chung ....................... 16/342 |
| 5,306,093 | A | * | 4/1994 | Elbert ....................... 403/259 |
| 5,312,199 | A | * | 5/1994 | Smith, Jr. ................. 403/79 |
| 5,333,356 | A | * | 8/1994 | Katagiri .................... 16/340 |
| 5,388,308 | A | * | 2/1995 | Meeuwissen .............. 16/340 |
| D357,922 | S | | 5/1995 | Nysether et al. |
| 5,429,336 | A | | 7/1995 | Ko |
| 5,715,576 | A | * | 2/1998 | Liu ............................ 16/342 |
| 5,751,548 | A | | 5/1998 | Hall et al. |
| D400,085 | S | | 10/1998 | Haskin |
| 5,820,253 | A | * | 10/1998 | Scholz ....................... 362/267 |
| 5,842,672 | A | | 12/1998 | Sweere et al. |
| D406,228 | S | | 3/1999 | Vogels |
| D412,167 | S | | 7/1999 | Rosen |
| 5,918,841 | A | | 7/1999 | Sweere et al. |
| 5,947,429 | A | | 9/1999 | Sweere et al. |
| 5,992,809 | A | | 11/1999 | Sweere et al. |
| 6,012,693 | A | | 1/2000 | Voeller et al. |

(Continued)

FOREIGN PATENT DOCUMENTS

JP    56-108393 A    *    8/1981

*Primary Examiner*—Amy J. Sterling
(74) *Attorney, Agent, or Firm*—Patterson, Thuente, Skaar & Christensen, P.A.

(57) ABSTRACT

A mounting system for a display such as a flat panel computer monitor or television includes a linkage of individual elements which are pivotally connected together with adjustable drag tapered bearings. Each tapered bearing allows individual elements to pivot with respect to one another about an axis defined by the tapered bearing, so that the display can be moved to a variety of different positions. By tightening the adjustable drag, the tapered bearing can lock the elements together.

21 Claims, 38 Drawing Sheets

U.S. PATENT DOCUMENTS

| | | |
|---|---|---|
| 6,015,120 A | 1/2000 | Sweere et al. |
| 6,042,068 A | 3/2000 | Tcherny |
| 6,068,227 A | 5/2000 | Morgan et al. |
| 6,102,348 A | 8/2000 | O'Neill |
| 6,116,806 A * | 9/2000 | Chang .................. 403/145 |
| 6,126,128 A | 10/2000 | Costa et al. |
| 6,146,045 A * | 11/2000 | Maughan ................ 403/165 |
| D435,852 S | 1/2001 | Oddsen, Jr. |
| D440,863 S | 4/2001 | Worrall |
| 6,299,259 B1 * | 10/2001 | MacKarvich ............ 301/127 |
| 6,308,377 B1 * | 10/2001 | Maatta .................... 16/341 |
| 6,367,756 B1 | 4/2002 | Wang |
| 6,378,830 B1 | 4/2002 | Lu |
| 6,381,808 B1 * | 5/2002 | Kida ...................... 16/340 |
| 6,394,403 B1 | 5/2002 | Hung |
| 6,402,109 B1 | 6/2002 | Dittmar |
| 6,409,134 B1 | 6/2002 | Oddsen, Jr. |
| D460,078 S | 7/2002 | Li |
| 6,517,040 B1 | 2/2003 | Wen |
| 6,554,238 B1 | 4/2003 | Hibberd |
| 6,565,056 B2 | 5/2003 | Lin |
| D477,606 S | 7/2003 | Theis et al. |
| 6,592,090 B1 | 7/2003 | Li |
| 6,604,722 B1 | 8/2003 | Tan |
| 6,619,606 B2 * | 9/2003 | Oddsen et al. ........... 248/282.1 |
| 6,663,064 B1 | 12/2003 | Minelli et al. |
| 6,672,553 B1 | 1/2004 | Lin |
| 2002/0011544 A1 | 1/2002 | Bosson |
| 2003/0075653 A1 | 4/2003 | Li |
| 2003/0136888 A1 | 7/2003 | Boele |
| 2003/0154673 A1 | 8/2003 | MacGregor et al. |
| 2003/0201372 A1 | 10/2003 | Dozier |
| 2003/0227739 A1 | 12/2003 | Kim et al. |
| 2004/0011932 A1 | 1/2004 | Duff |
| 2004/0011938 A1 | 1/2004 | Oddsen, Jr. |

* cited by examiner

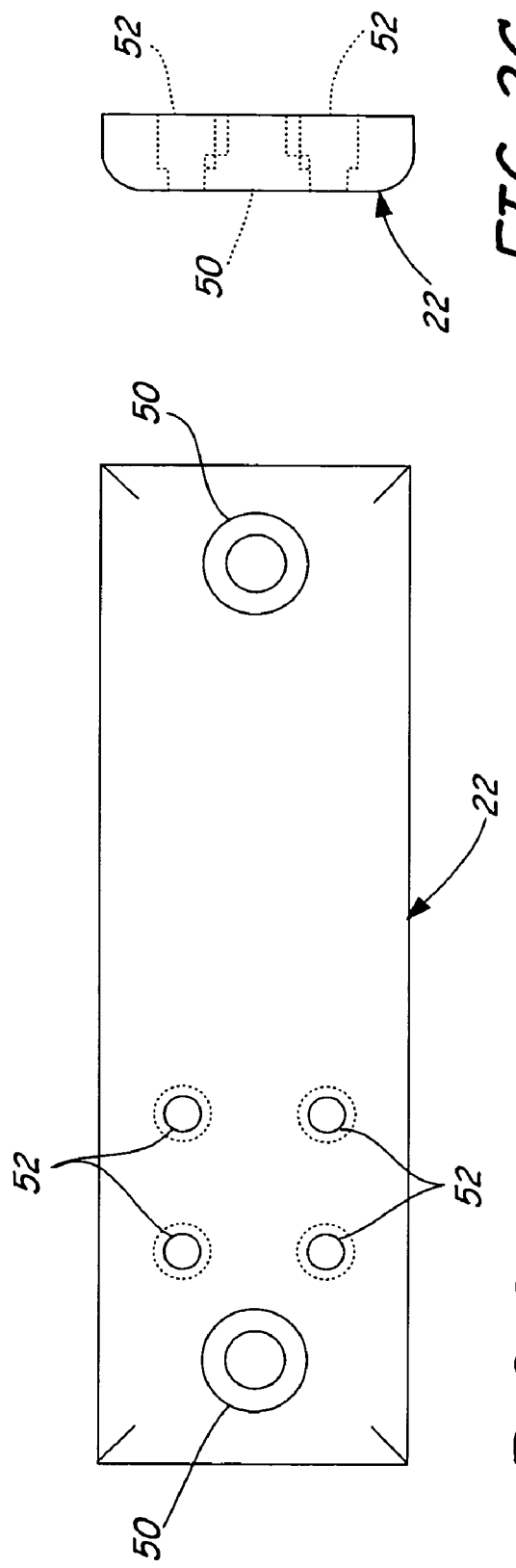

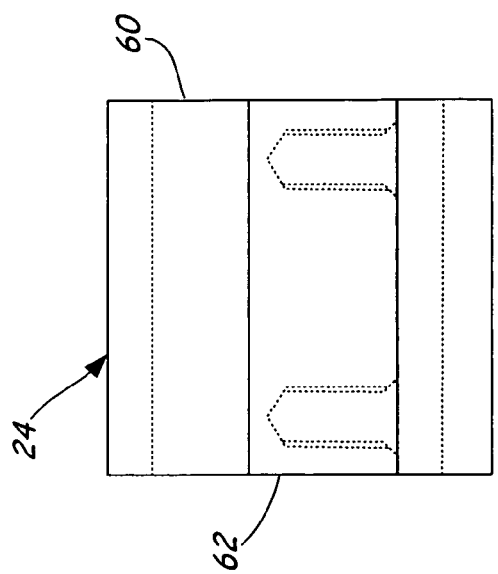
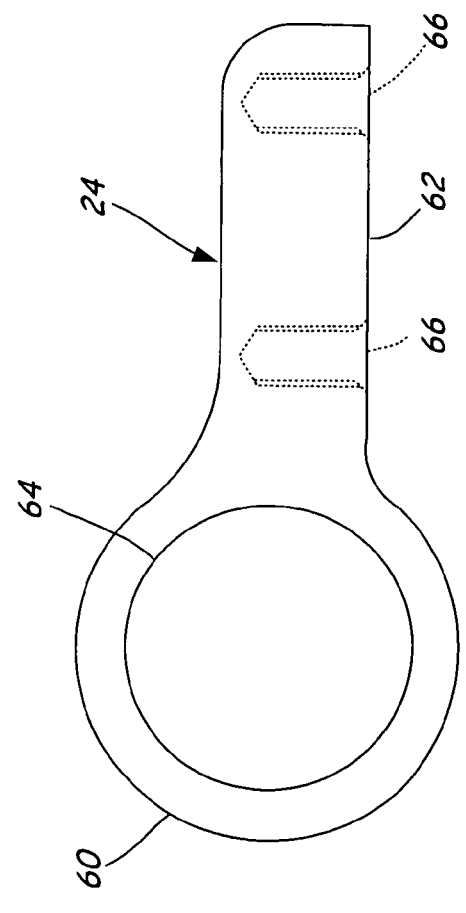
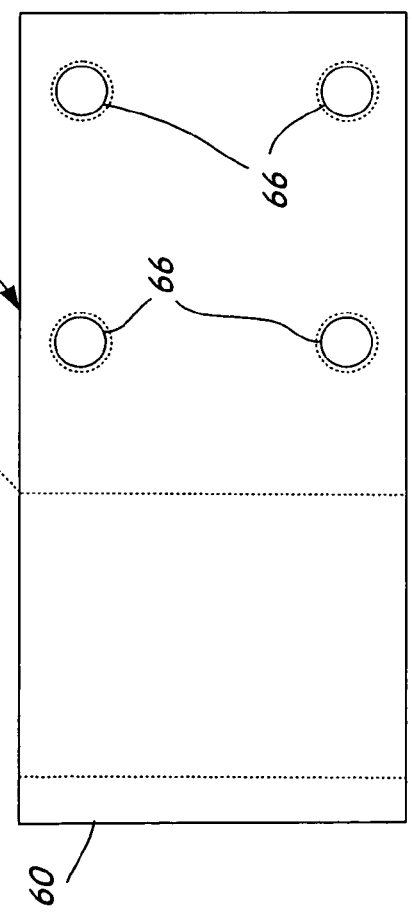
FIG. 3C
FIG. 3A
FIG. 3B

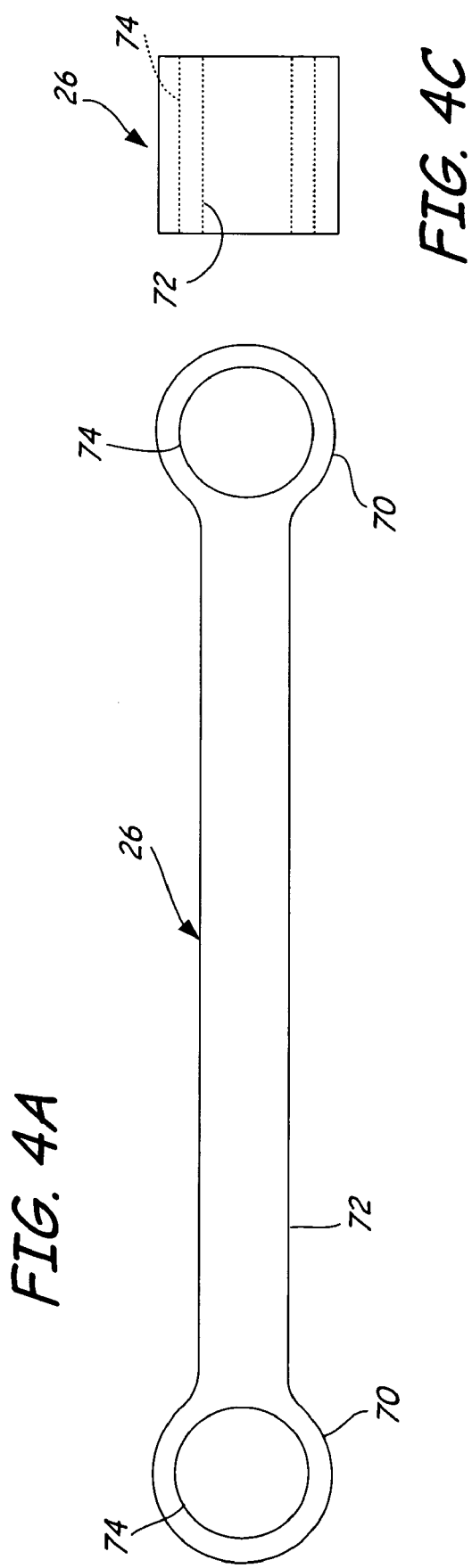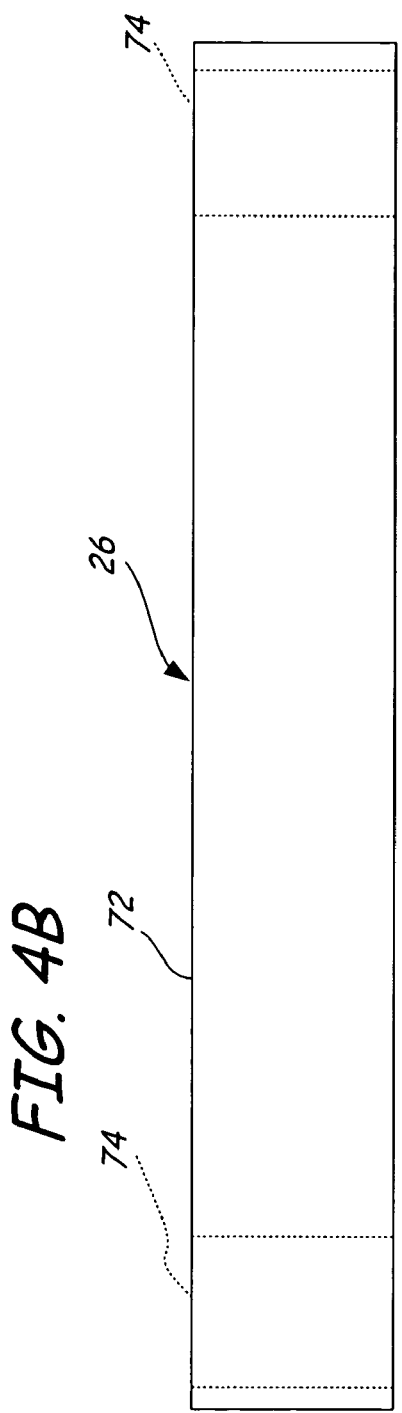
FIG. 4A  FIG. 4B  FIG. 4C

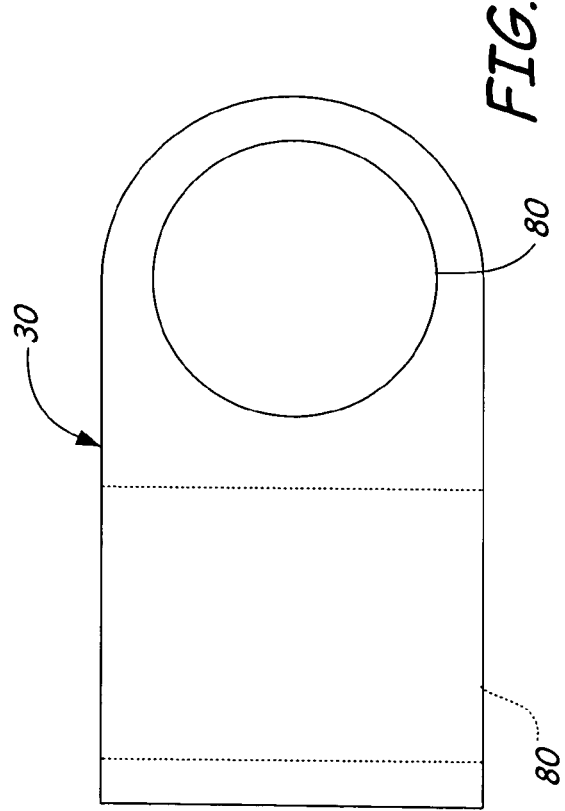
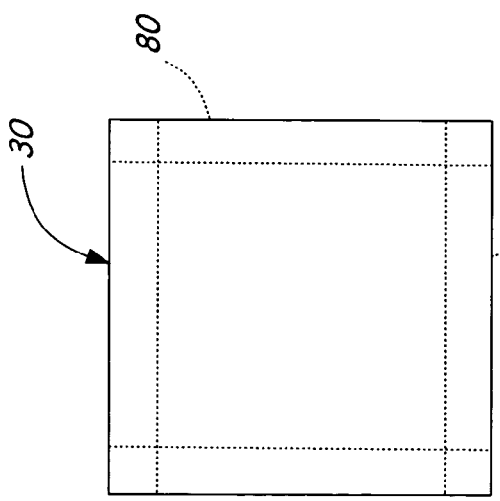
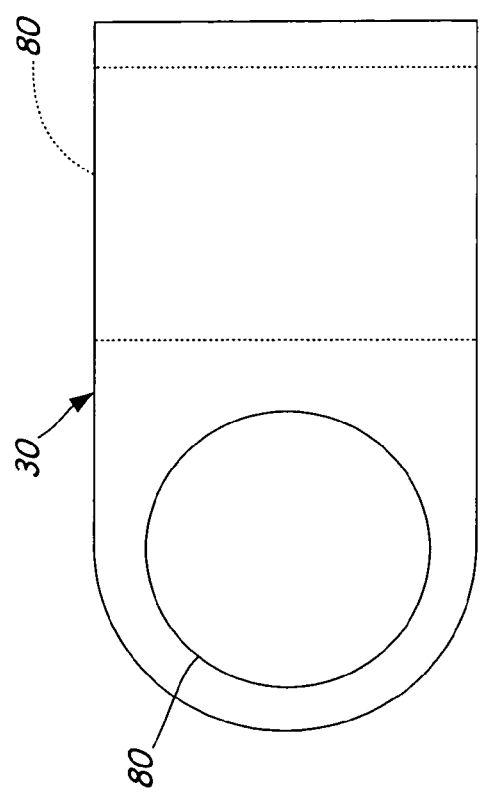
FIG. 5B
FIG. 5C
FIG. 5A

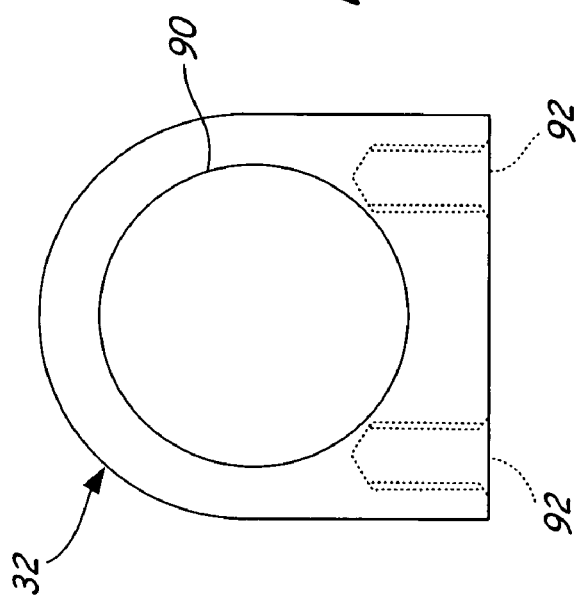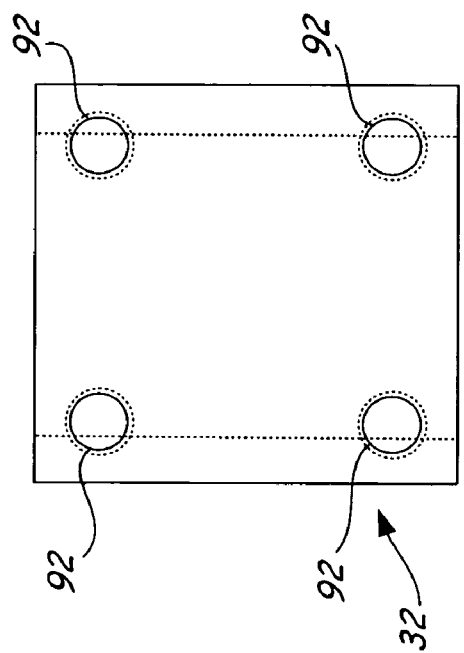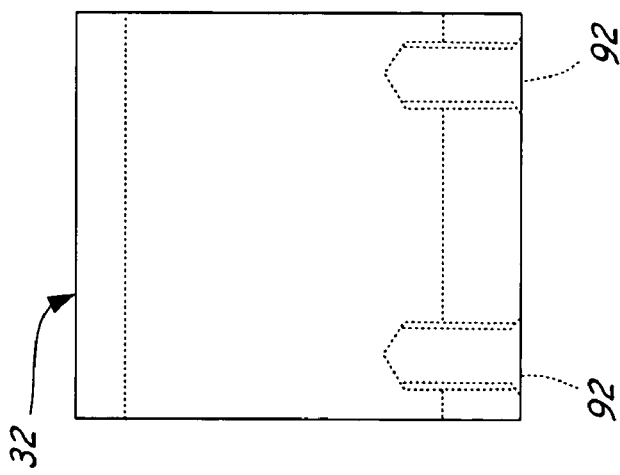

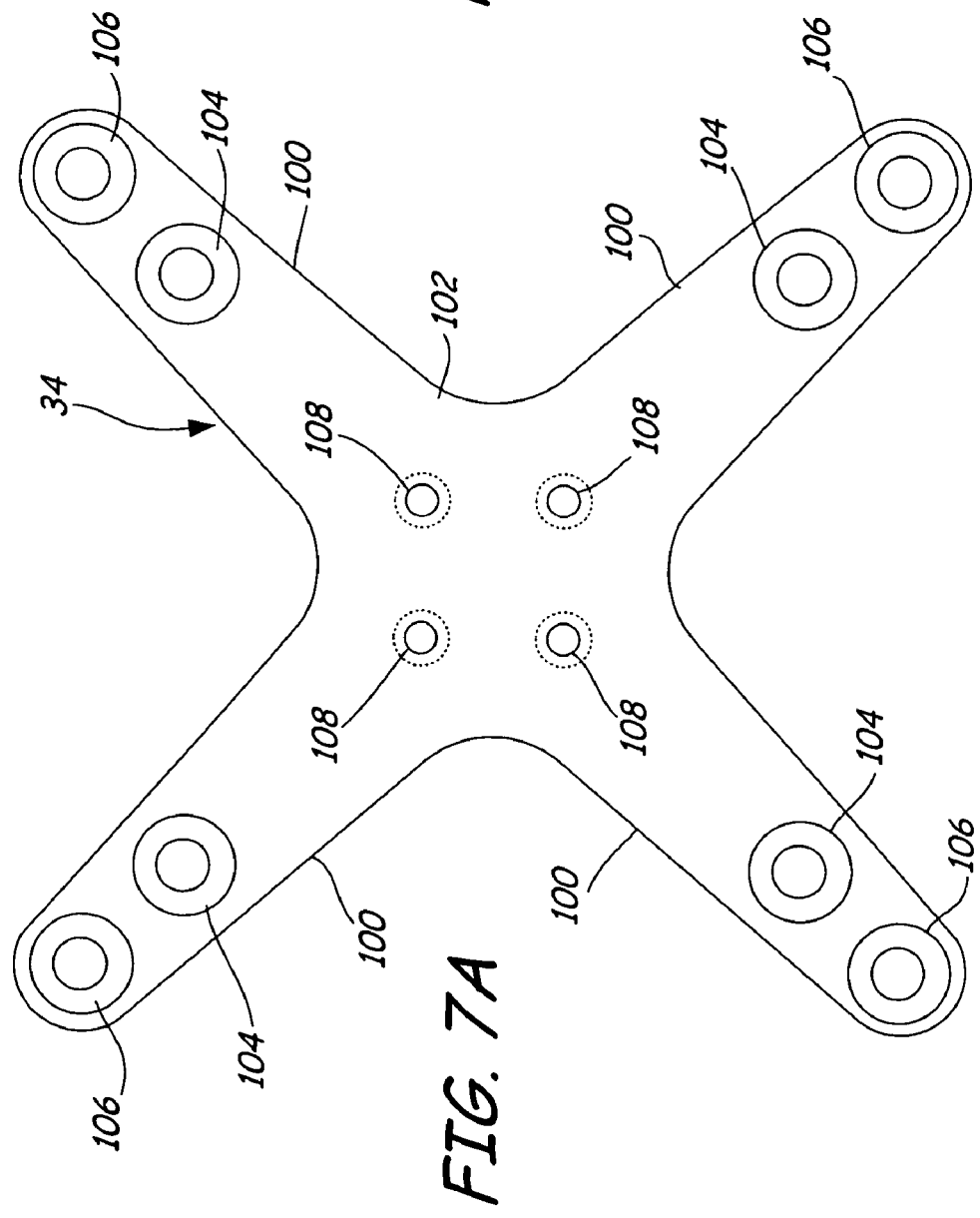

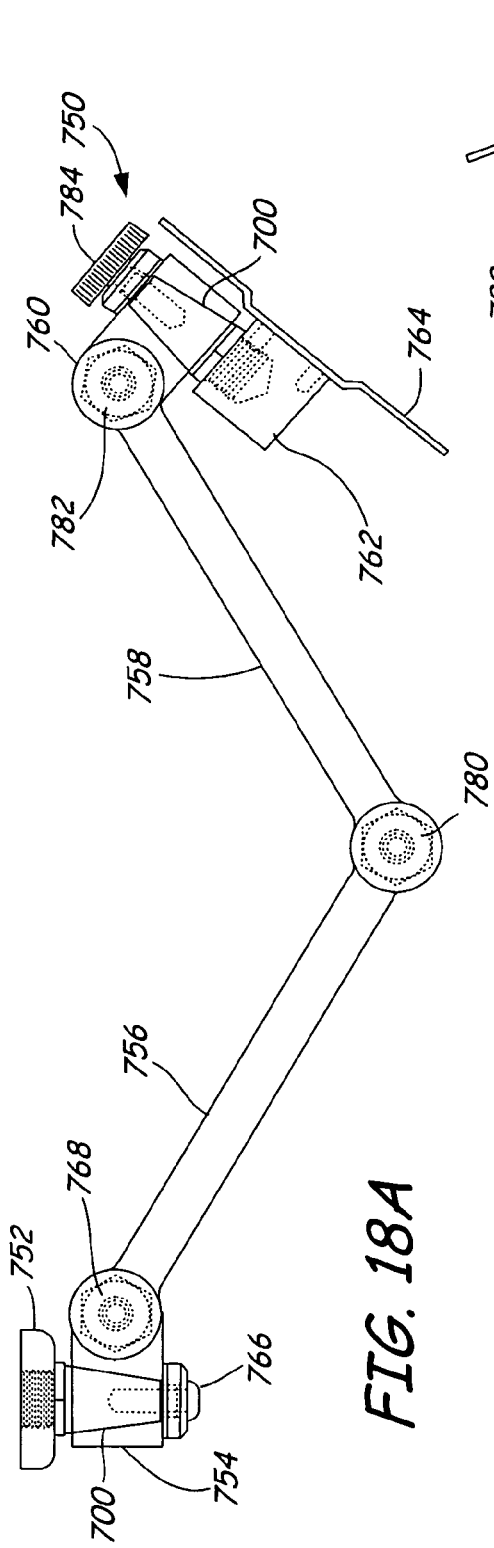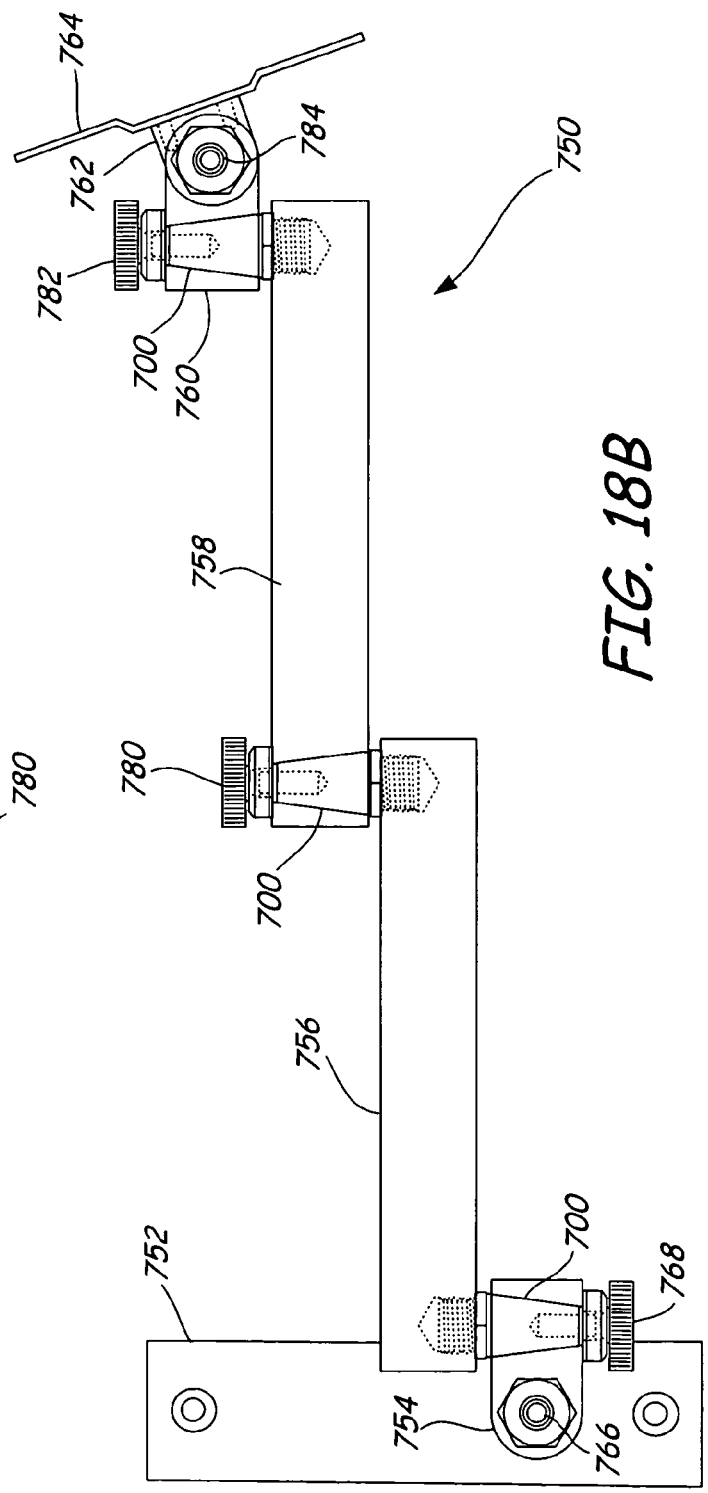
FIG. 18A
FIG. 18B

ARTICULATED MOUNT

CROSS-REFERENCE TO RELATED APPLICATION

This application claims priority to provisional application Ser. No. 60/438,965, filed Jan. 9, 2003.

BACKGROUND OF THE INVENTION

The present invention relates to mount systems for interface devices such as flat panel computer monitors and televisions. In particular, the present invention is an articulated mount which allows the display to be moved and stably held in a wide range of different positions.

The development of flat panel computer monitors and flat screen televisions offers the opportunity to replace large computer monitors and large television sets with displays having the same screen area but only a small fraction of the depth and weight. This allows computer monitors to be placed on desks without consuming a large portion of the desk top space. Similiarily, flat screen televisions can be placed in locations which were previously not practical locations.

The light weight and thin profile of the flat panel monitors and televisions allows them to be supported on a relatively small base, be hung on a wall, or to be supported by a support system which is connected to a mounting surface such as a wall, a post, or a top, bottom, or side surface of a desk or cabinet. The ability to adjust the orientation of the flat panel display with respect to the viewer is a desirable feature. There is a need for mounting systems which will allow adjustment of the position and the orientation of the display. The support systems should be simple and easy to use, and should be stable so that the display remains in the position and orientation selected.

BRIEF SUMMARY OF THE INVENTION

A mounting system for supporting a display stably in many different positions includes a linkage of individual elements which are pivotally connected together by adjustable drag tapered bearings. The tapered bearings allow individual elements to pivot with respect to one another so that the display can be moved to a variety of different positions. By tightening the adjustable drag, the tapered bearing can lock adjacent elements together.

BRIEF DESCRIPTION OF THE DRAWINGS

FIGS. 2A–2C show a wall plate of the mount of FIGS. 1A–1C.

FIGS. 3A–3C show a side knuckle of the mount of FIGS. 1A–1C.

FIGS. 4A–4C show a dog bone arm of the mount of FIGS. 1A–1C.

FIGS. 5A–5C show a 90° knuckle element of the mount of FIGS. 1A–1C.

FIGS. 6A–6C show a solo knuckle element of the mount of FIGS. 1A–1C.

FIGS. 7A and 7B show a star mounting plate of the mount of FIGS. 1A–1C.

FIGS. 18A and 18B show a double arm mount in accordance with the present invention in using the threaded spindle tapered bearing of FIGS. 17A–17C.

DETAILED DESCRIPTION

Figure 1A:
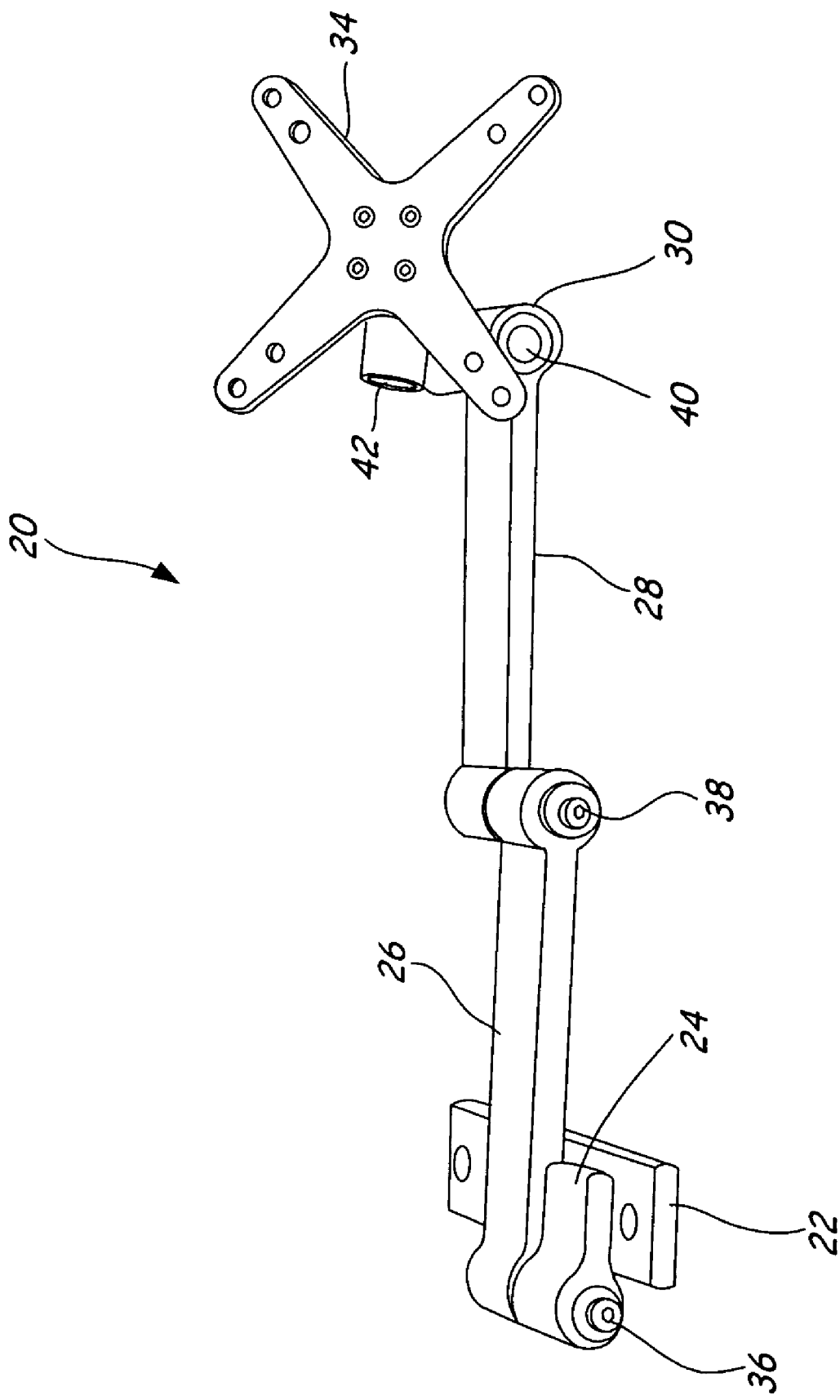
FIGS. 1A–1C show a double arm articulated mount for a flat panel display in accordance with the present invention.
Figure 1B:
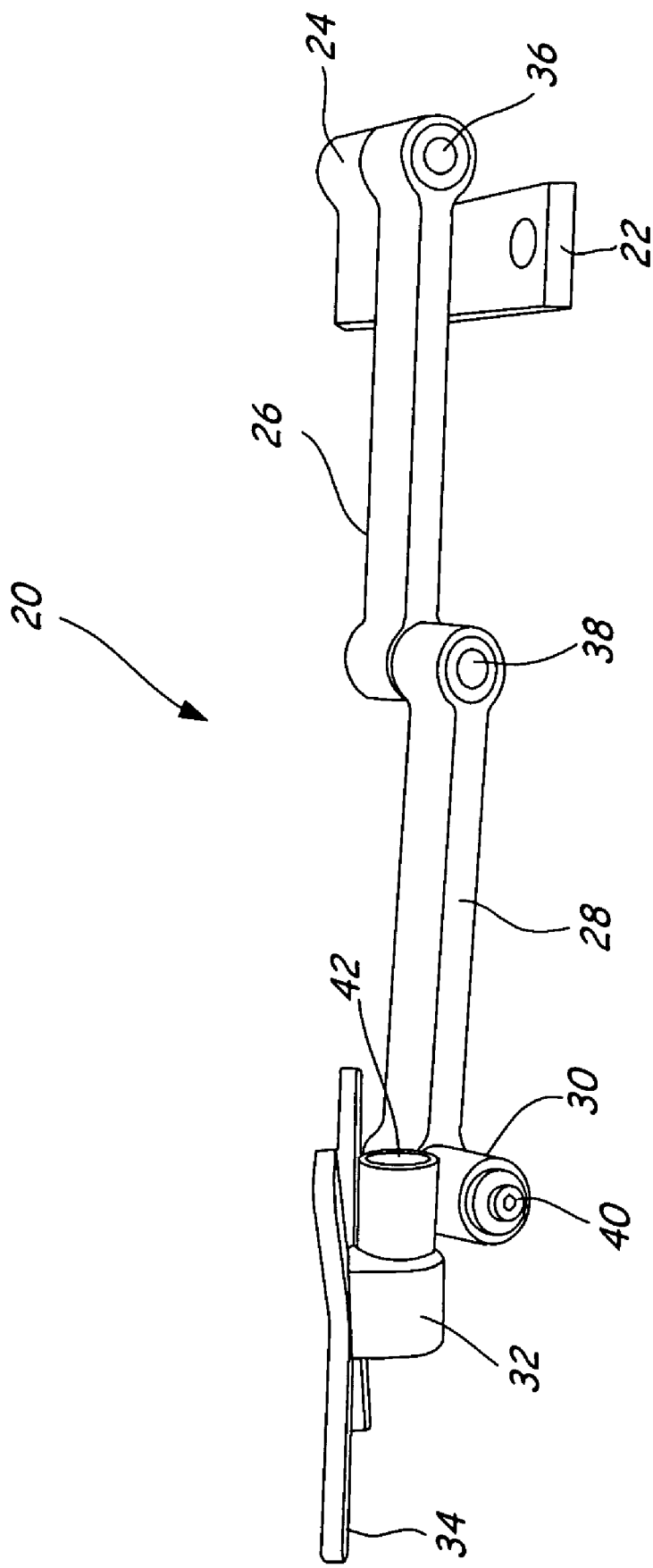
Figure 1C:
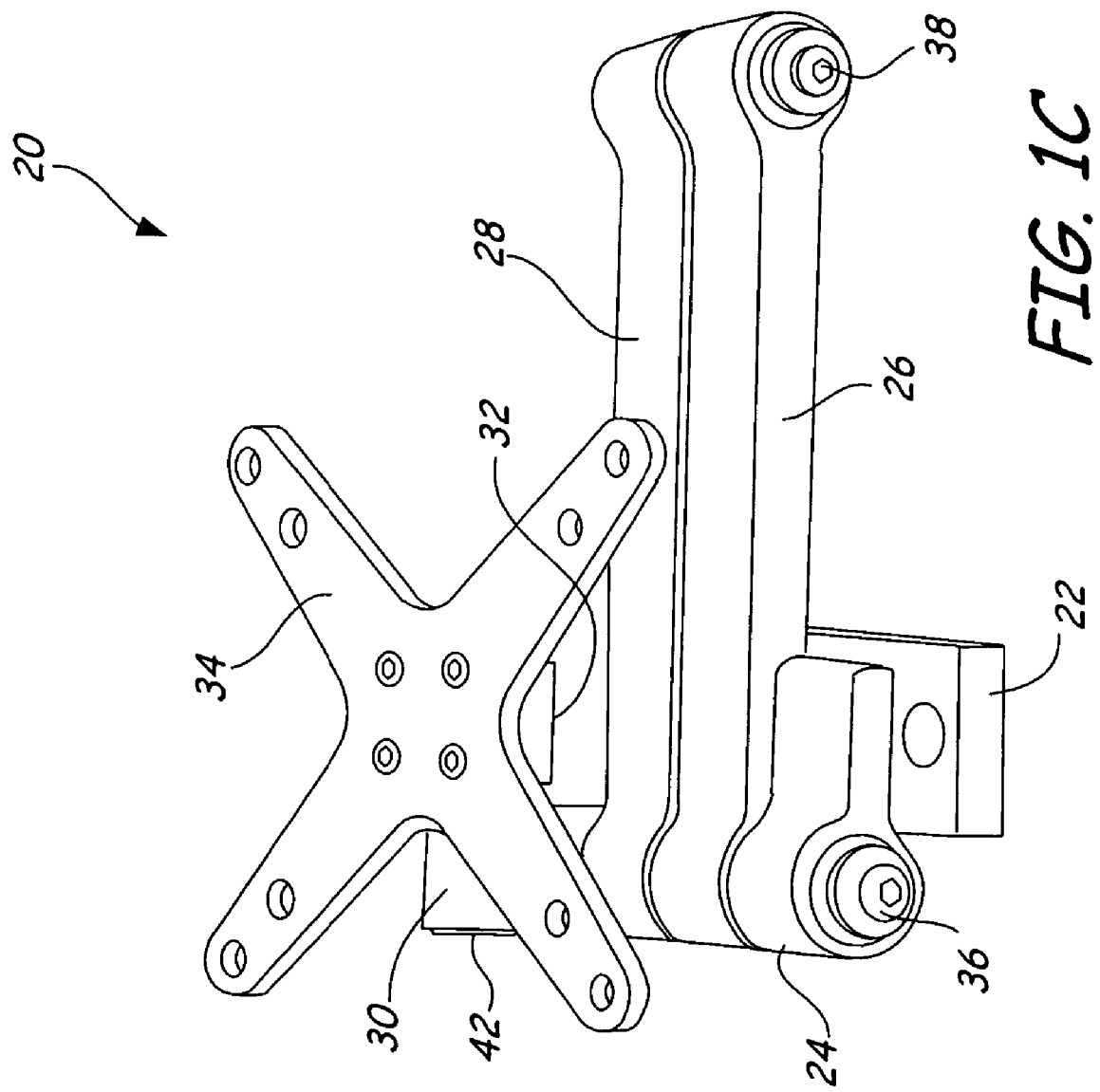

FIGS. 1A–1C show articulated double arm mount 20 which is used to adjustably mount and position a flat panel display, such as a computer monitor or television. FIGS. 1A and 1B show mount 20 in an extended position, while FIG. 1C shows mount 20 in a collapsed position.

Mount 20 includes wall plate 22, side knuckle 24, dog bone arms 26 and 28, 90° knuckle 30, solo knuckle 32, star mounting plate 34, and tapered bearings 36, 38, 40, and 42.

Wall plate 22 is mounted by screws or bolts to a wall, post, or to the top, sides, under surfaces or the like of a desk cabinet. Wall plate 22 forms the base from which the rest of mount is supported.

Side knuckle 24 is fixed to wall plate 22 by screws which are inserted through the bottom of wall plate 22 into side knuckle 24.

Tapered bearing 36 pivotally connects side knuckle 24 to the inner end of dog bone arm 26. Tapered bearing 36 is an adjustable drag tapered bearing which allows pivotal rotation of arm 26 with respect to side knuckle 24 with a selectable amount of drag. When desired, taper bearing 36 is tightened in an axial direction to lock arm 26 in place with respect to side knuckle 24.

The outer end of arm 26 is pivotally connected to the inner end of arm 28 by tapered bearing 38. The drag provided by bearing 38 is adjustable so that a smooth rotational motion with a selected amount of drag can be provided, or arms 26 and 28 can be locked together at bearing 38 so that they move together as a unit.

90° knuckle 30 is positioned at the outer end of arm 28. Tapered bearing 40 pivotally connects 90° knuckle 30 to the outer end of arm 28. Knuckle 30 provides a second pivotal connection at 90° to the axis of tapered bearing 40. Tapered bearing 42 connects the upper end of knuckle 30 to solo knuckle 32.

Mounting plate 34 is connected by screws to single knuckle 32. A flat screen display (not shown) is connected on its back side to mounting plate 34 by mounting screws.

Mount 20 provides a wide range of different positions and attitudes of mounting plate 34 with respect wall plate 22. As a result, a wide range of different positions and orientations of a flat screen display can be achieved.

FIGS. 2A through 12 show the components of mount 20 in greater detail. FIGS. 2A–2C show wall plate 22. As shown in FIGS. 2A–2C, wall plate 22 is generally rectangular with rounded corners on its upper surface. A pair of counter sunk mounting holes 50 are located at near opposite ends of wall plate 22. Screws or bolts are used with holes 50 to mount wall plate 22 to wall, post, or other surface.

Extending from the back surface of wall plate 22 are counterbored mounting holes 52. Screws extend through mounting holes 52 to attach side knuckle 24 to mount plate 22, as shown in FIGS. 1A–1C.

Side knuckle 24 is shown in FIGS. 3A–3C. Side knuckle 24 includes head 60 and side arm 62. Cylindrical bore 64 extends through head 60. Four mounting holes 66 are located in the bottom of side arm 62.

Mounting holes 66 are threaded to receive screws, so that side knuckle 24 can be mounted to another component having a similar hole pattern, such as wall plate 22.

Bore 64 receives a bushing which forms apart of tapered bearing 36. The components of the tapered bearings will be described in further detail with reference FIGS. 8A–8C, 9A, 9B, 10A, 10B, 11A, 11B, and 12.

FIGS. 4A–4C show dog bone arm 26, which is identical to dog bone arm 28. Dog bone arm 26 has heads 70 at opposite ends which are connected by arm 72. Cylindrical bores 74 extend through heads 70 for receiving tapered bearing.

FIGS. 5A–5C show 90° knuckle 30 which has a pair of bores 80 at opposite ends which are oriented at 90° to one another. In cooperation with the tapered bearings, 90° knuckle 30 provides rotation in two generally orthogonal directions, which greater increases the adjustability in position of the display.

FIGS. 6A–6C show solo knuckle 32, which has a single bore 90 and four mounting holes 92. In the embodiment shown in FIGS. 1A–1C mounting holes 92 align with corresponding holes in visa star mounting plate 34 so that solo knuckle 32 provides a fixed connection to mounting plate 34.

FIGS. 7A and 7B show star mounting plate 34 which has four mounting arms 100 extending outward from central section 102. Each arm 100 carries an inner mounting hole 104 and an outer mounting hole 106 for use in connecting mounting plate 34 to the back side of flat panel display.

Center portion 102 of mount 34 has a set of four mounting holes 108 which is used for connection between mounting plate 34 and side knuckle 32.

Figure 8C:
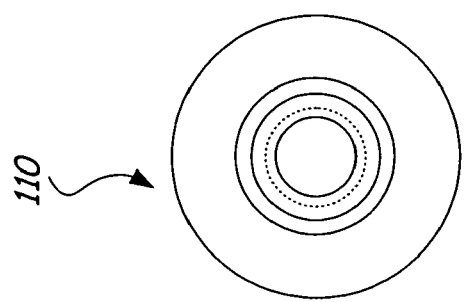
FIGS. 8A–8C show a tapered axle of the tapered bearings of the mount of FIGS. 1A–1C.
Figure 8B:
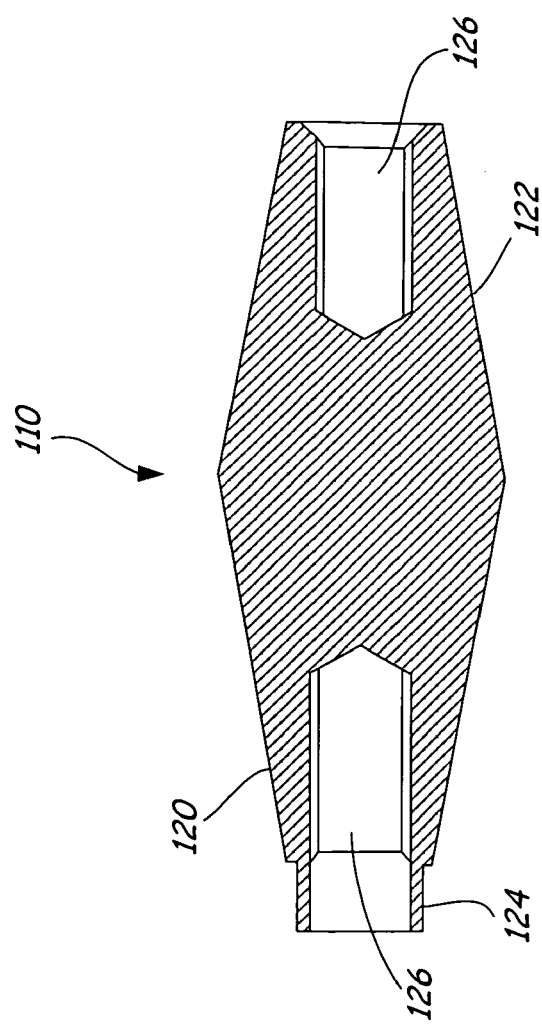
Figure 8A:
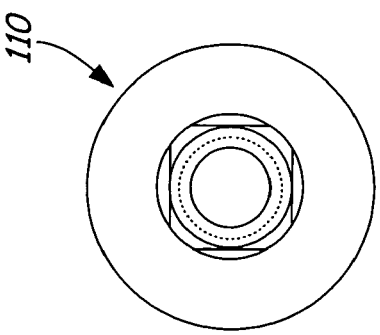
Figure 12:
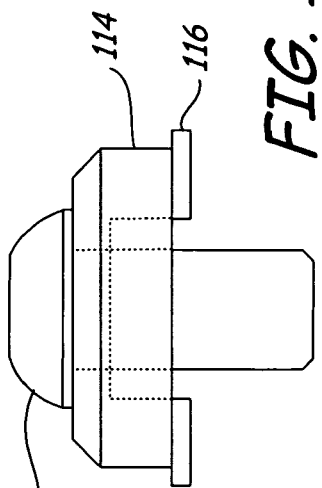
FIG. 12 is an assembly drawing illustrating the tension cap and washer together with an adjustment screw as used in the tapered bearing.

FIGS. 8A–12 show the components of tapered bearings 36, 38, 40, and 42 used in the embodiment of FIGS. 1A–1C. FIGS. 8A–8C show tapered axle 110. FIGS. 9A and 9B show split bushing 112. FIGS. 10A and 10B show tension cap 114. FIGS. 11A and 11B show washer 116. FIG. 12 shows a partial assembly drawing including tension cap 114, washer 116, and adjustment screw 118.

Each of the tapered bearings 36, 38, 40, and 42 have a similar construction. Each makes use of a tapered spindle and tapered bore which are axially moveable with respect to one another to adjust the amount of drag.

As shown in FIGS. 8A, tapered axle 110 has a tapered spindle 120 at one end, and a tapered mount 122 at an opposite end. Extending from the outer end of the spindle 120 is square neck 124. Threaded bore 126 extends through neck 124 and into threaded spindle 120. At the opposite end of axle 110, threaded bore 126 extends into tapered mount 122.

Tapered spindle 120 and tapered mount 122 have the same taper, so that both will mate with split bushing 112. The difference is that tapered spindle 120 is used for pivotal rotation, while tapered mount 122 is clamped into one of the bushings 112 to hold tapered axle 110 in a non-rotating condition.

Figure 9B:
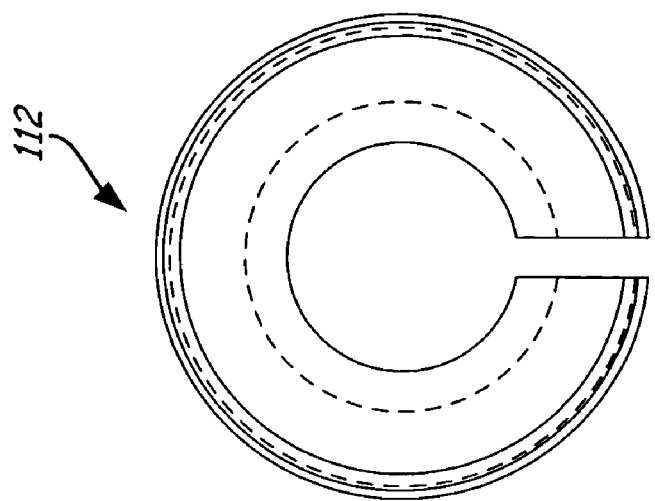
FIGS. 9A and 9B show a split bushing of the tapered bearing.
Figure 9A:
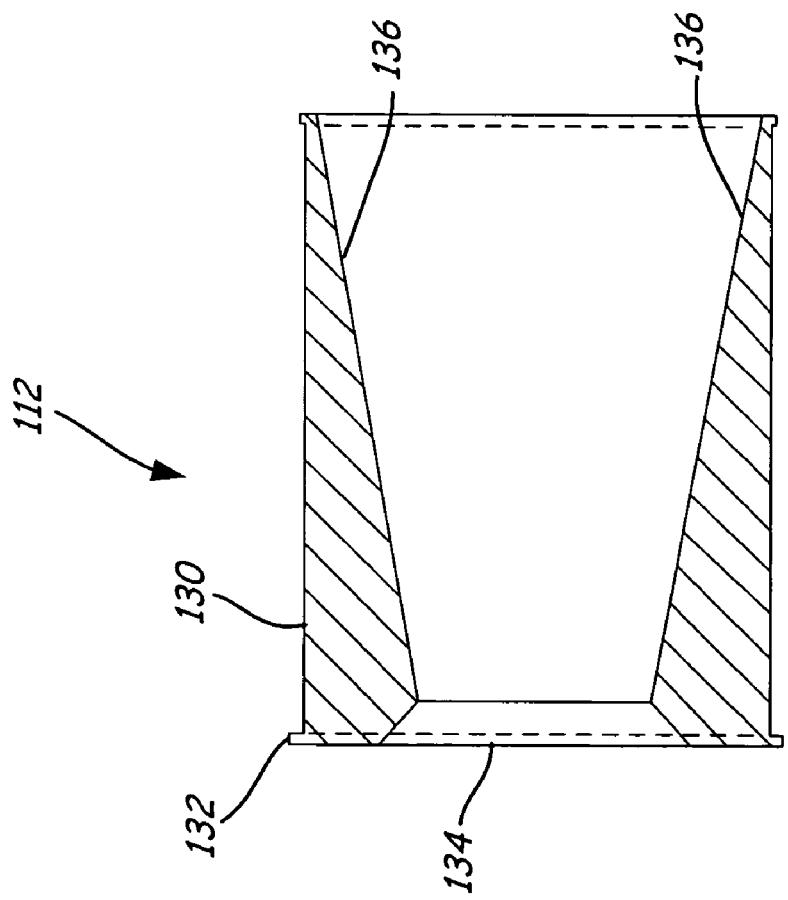

Split bushing 112 shown in FIGS. 9A and 9B is a split sleeve having a cylindrical outer wall surface 130, and flange 132 at one end. Counter bore 134 is located at one end and tapered bore 136 extends from the opposite end of bushing 112. Tapered bore 136 receives either tapered spindle 120 or tapered mount 122 of tapered axle 110.

Figure 10B:
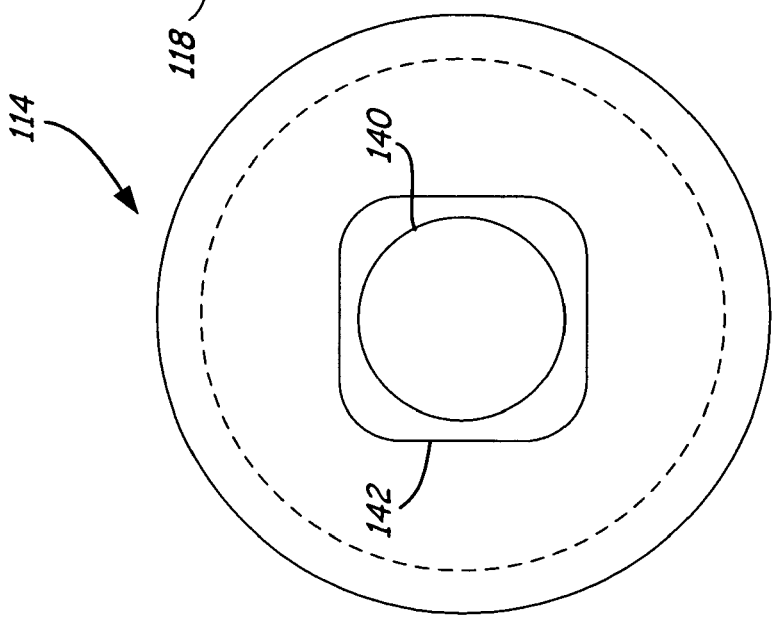
FIGS. 10A and 10B show a tension cap of the tapered bearing.
Figure 10A:
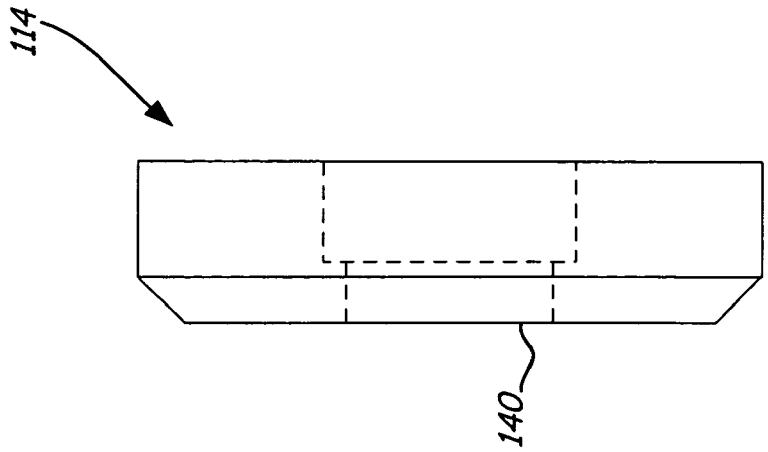
Figures 11A, 11B:
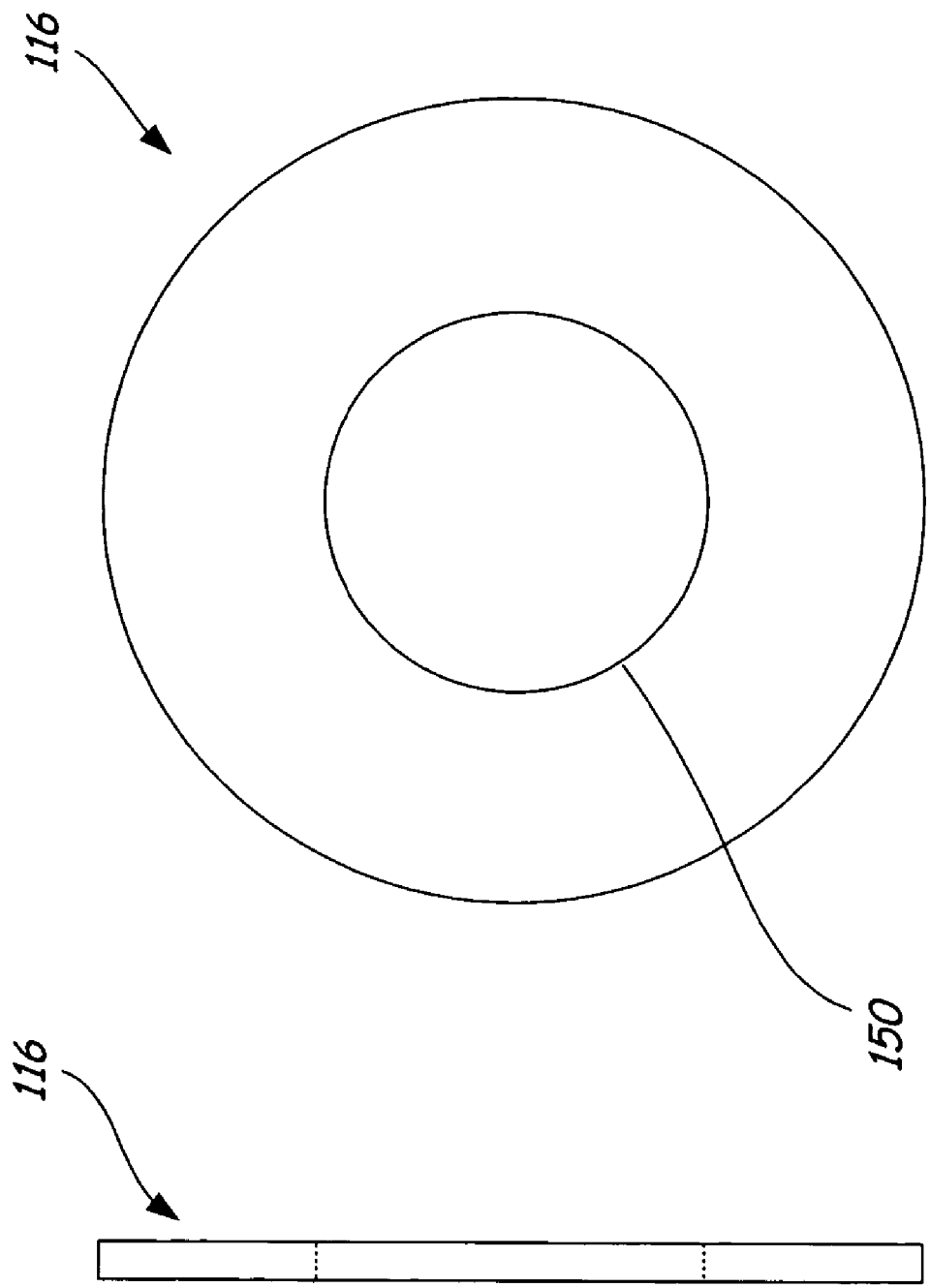
FIGS. 11A and 11B show a washer of the tapered bearing.
Figure 13A:
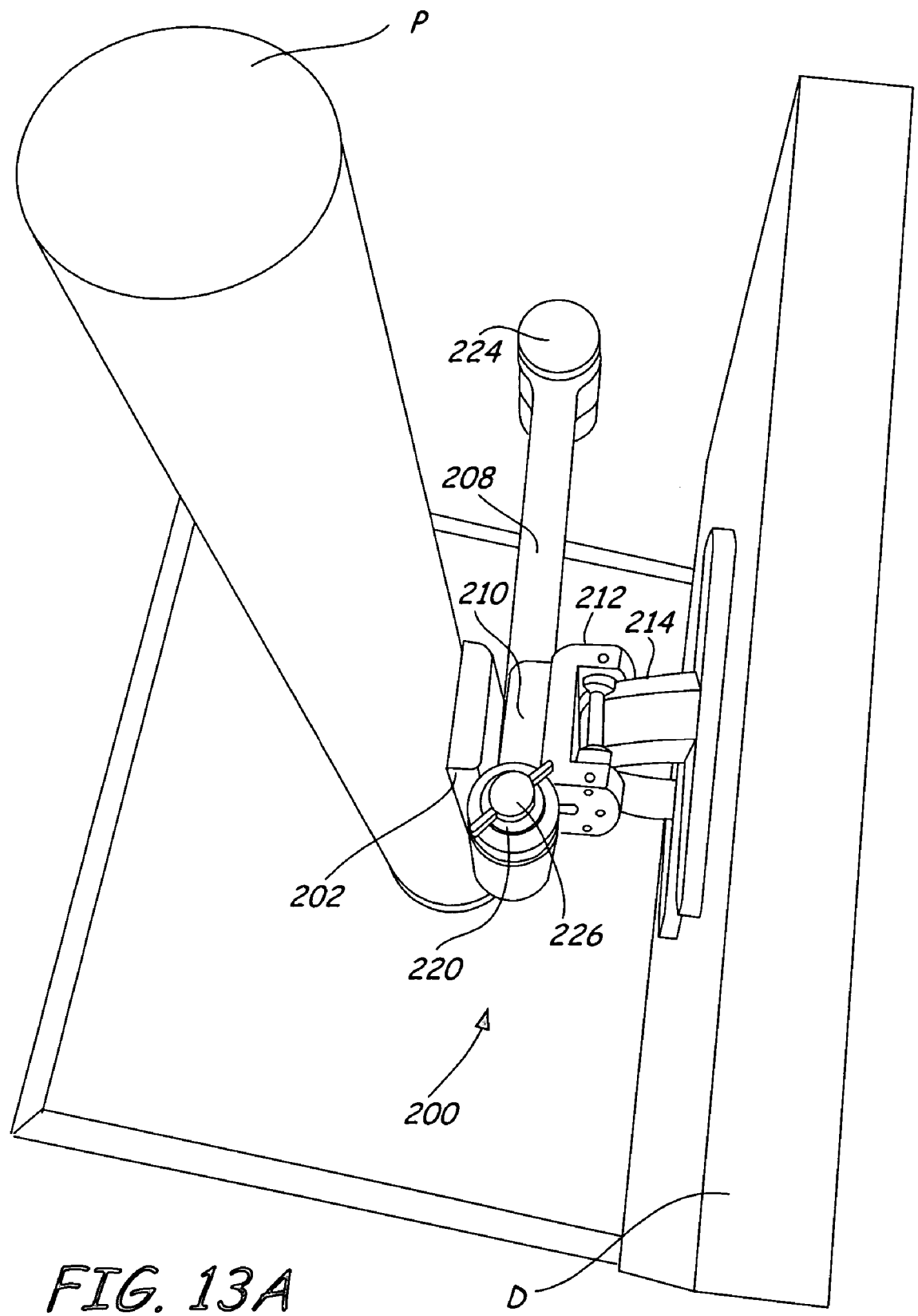
FIG. 13A–13D show another double arm mount of the present invention.
Figure 13B:
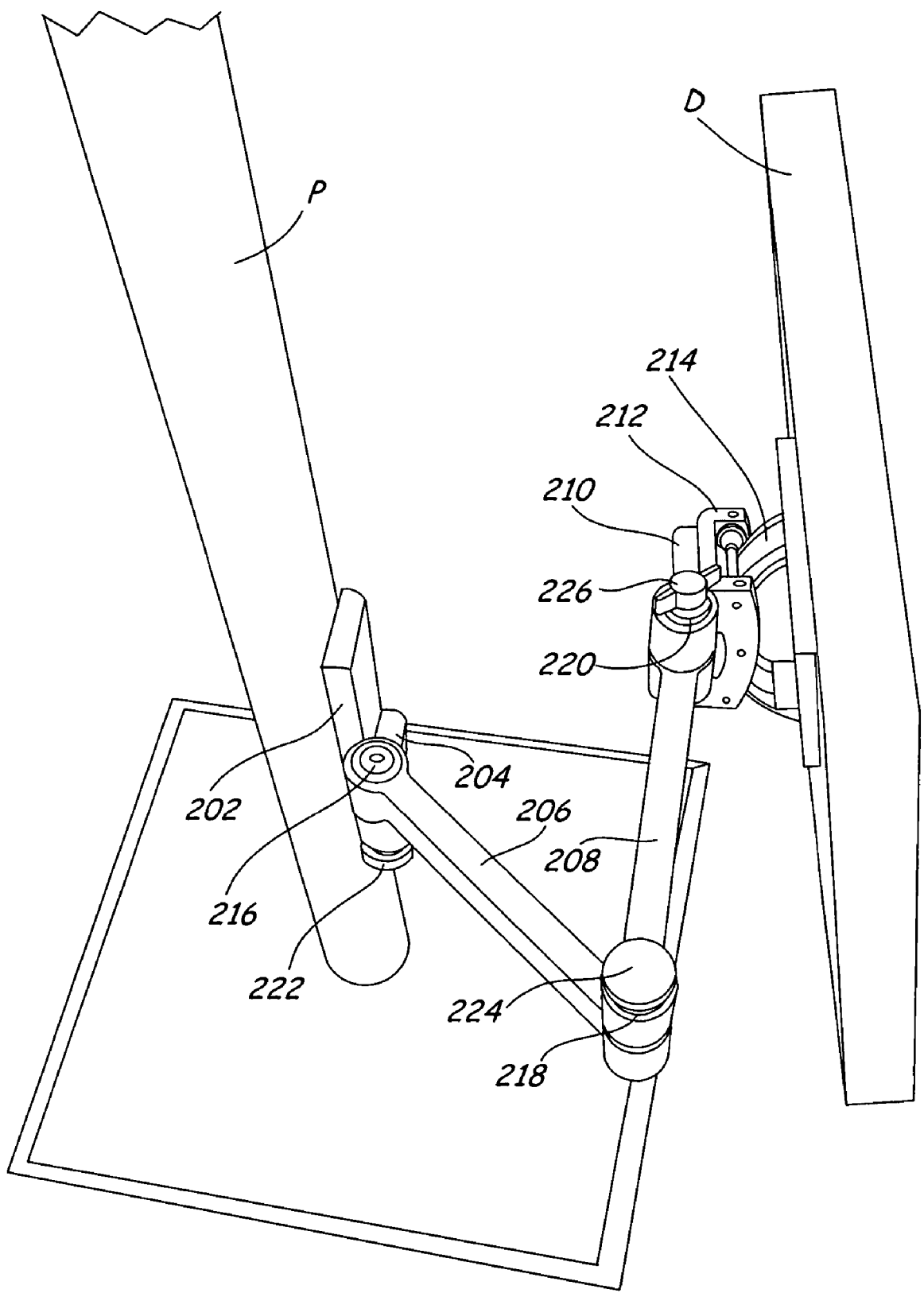
Figure 13C:
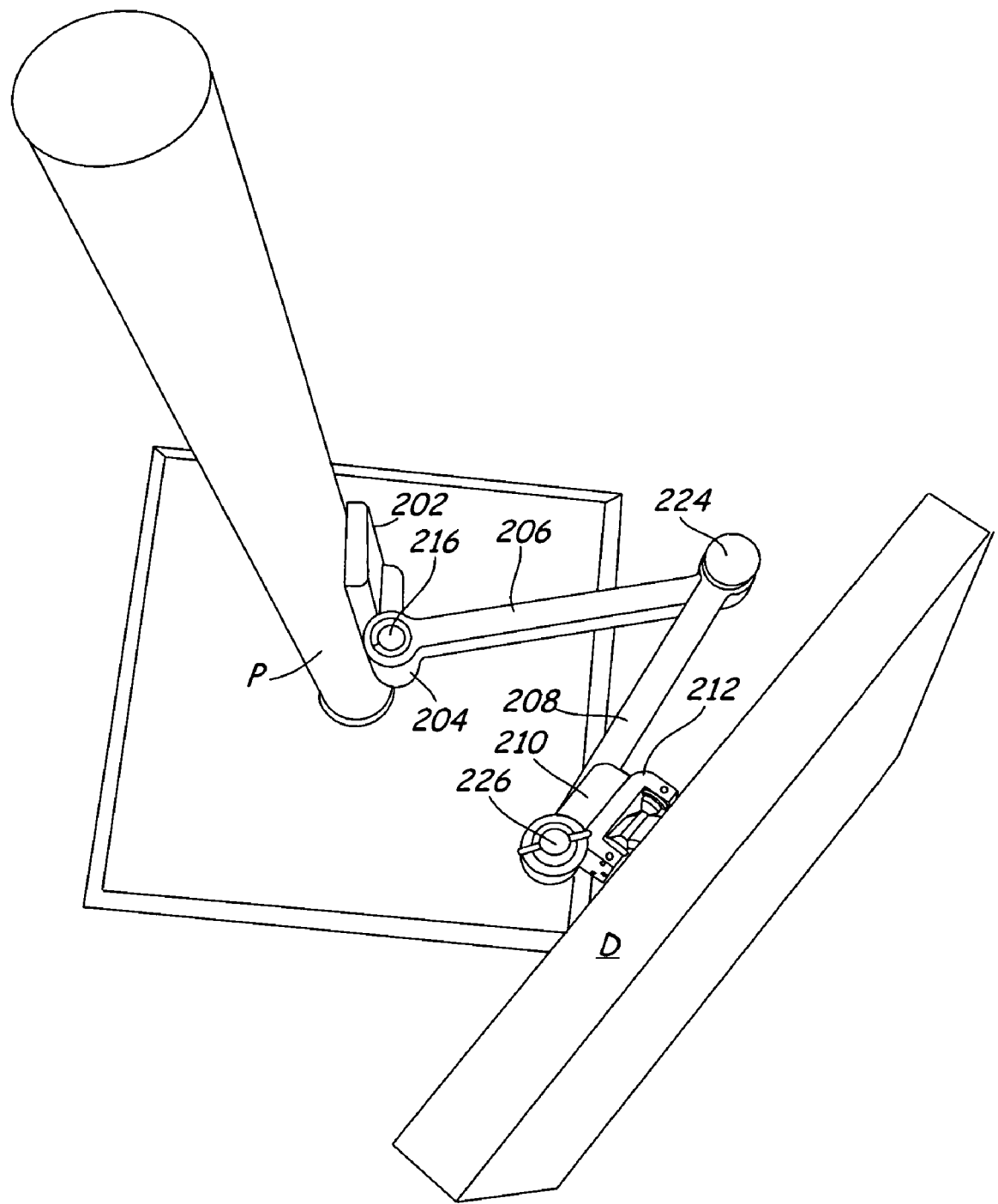
Figure 13D:
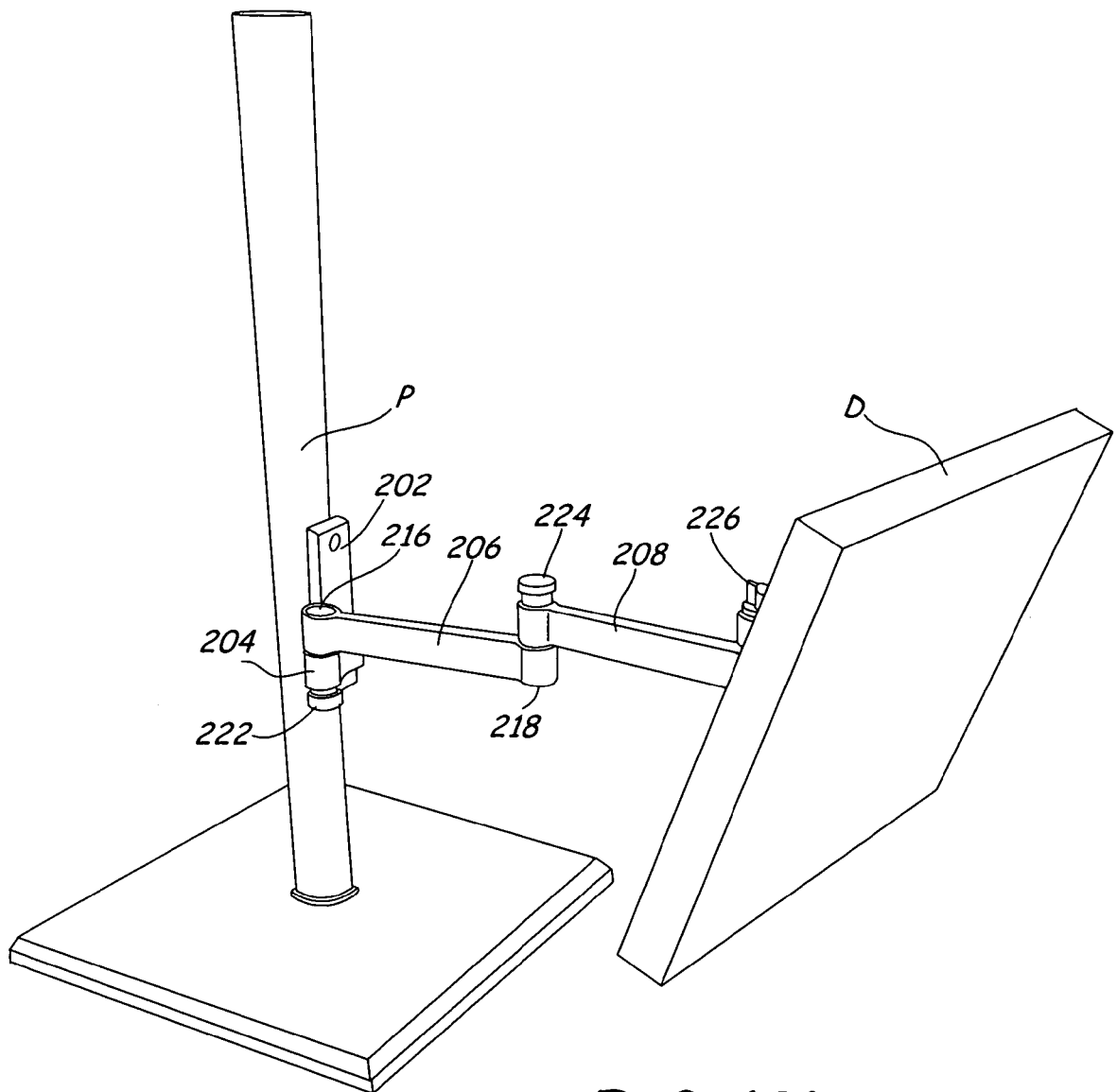

Tension cap shown in FIGS. 10A and 10B is used as part of the mechanism to change the relative axial position of tapered spindle 120 with respect to tapered bore 136 to change the drag of the tapered bearing. Tension cap 114 has a circular ring having through hole 140 and squared counter bore 142. Counter bore 142 mates with square neck 124 of tapered axial 110.

Washer 116 is sized to fit between tension cap 114 and flange 132 of split bushing 112. Through hole 150 of washer 116 is large enough to mate square neck 124 of tapered axial 110.

FIG. 12 shows an assembly drawing showing the relative positions of washer 116, tension cap 114, and adjustment screw 118. In FIG. 12, a round head allen-drive screw similar to those shown in FIGS. 1A–1C is used to apply force between the upper surface of tension cap 114 and tapered axle 110. As screw 118 is tightened, is pulls tapered axle 110 in a direction toward tension cap 114, which increases friction between tapered spindle 120 and tapered bore 136. With sufficient tightening, the friction between tapered spindle 120 and tapered bore 136 reaches a level at which the two surfaces are located together. With less tightening of screw 118, a variable amount of friction producing a variable drag is achieved.

The square neck of tapered axle 120 and the square bore in the bottom surface of tension cap 114 prevent relative rotation of tension cap 114 and tapered axle 110 which could result in unintended loosening of adjustment screw 118.

The mounting system of the present invention can take a number of different forms using the same group of components. Greater or fewer pivot axes, resulting in greater or fewer degrees of freedom of movement of the display, can be achieved by adding or subtracting components.

Other variations are also possible. For example, the adjustment screws shown in FIGS. 1A–1C require the use of an Allen wrench to tighten or loosen screws and thereby adjust drag. Other screws with a knob or wing type head can be used making an adjustment of drag easier without the need for a special tool such as an Allen wrench.

Another modification consistent with the present invention is the use of tapered bores which are formed in the element, for example by machining, or injection molding or die casting. This eliminates the need for bushings, but does increase manufacturing costs of the individual elements.

FIGS. 13A–13D show another embodiment of a double arm mount in accordance with the present invention. As shown in FIGS. 13A–13D, mount 200 is connected at one end to pole P, and at the opposite end to flat panel display D. Mount 200 includes wall plate 202, side knuckle 204, first dog bone arm 206, second dog bone arm 208, side knuckle 210, support 212, mount 214, and tapered bearings 216, 218, and 220. In this embodiment, adjustment screw 222, tapered bearing 216 has a thumb screw head, as does adjustment screw 224 of tapered bearing 218. Adjustment screw 226 of tapered bearing 220 has a wing head.

Mount 200 works in generally the same fashion as mount 20 of FIGS. 1A–1C. One difference is the addition of support 212 and mount 214, which slide relative to one another in an arcuate path. The arc defined by the path of sliding movement defines a pivot axis about which display D tilts. Display D is weight balanced about the pivot axis, so that it stays in a stable position regardless of the tilt angle.

Figure 14A:
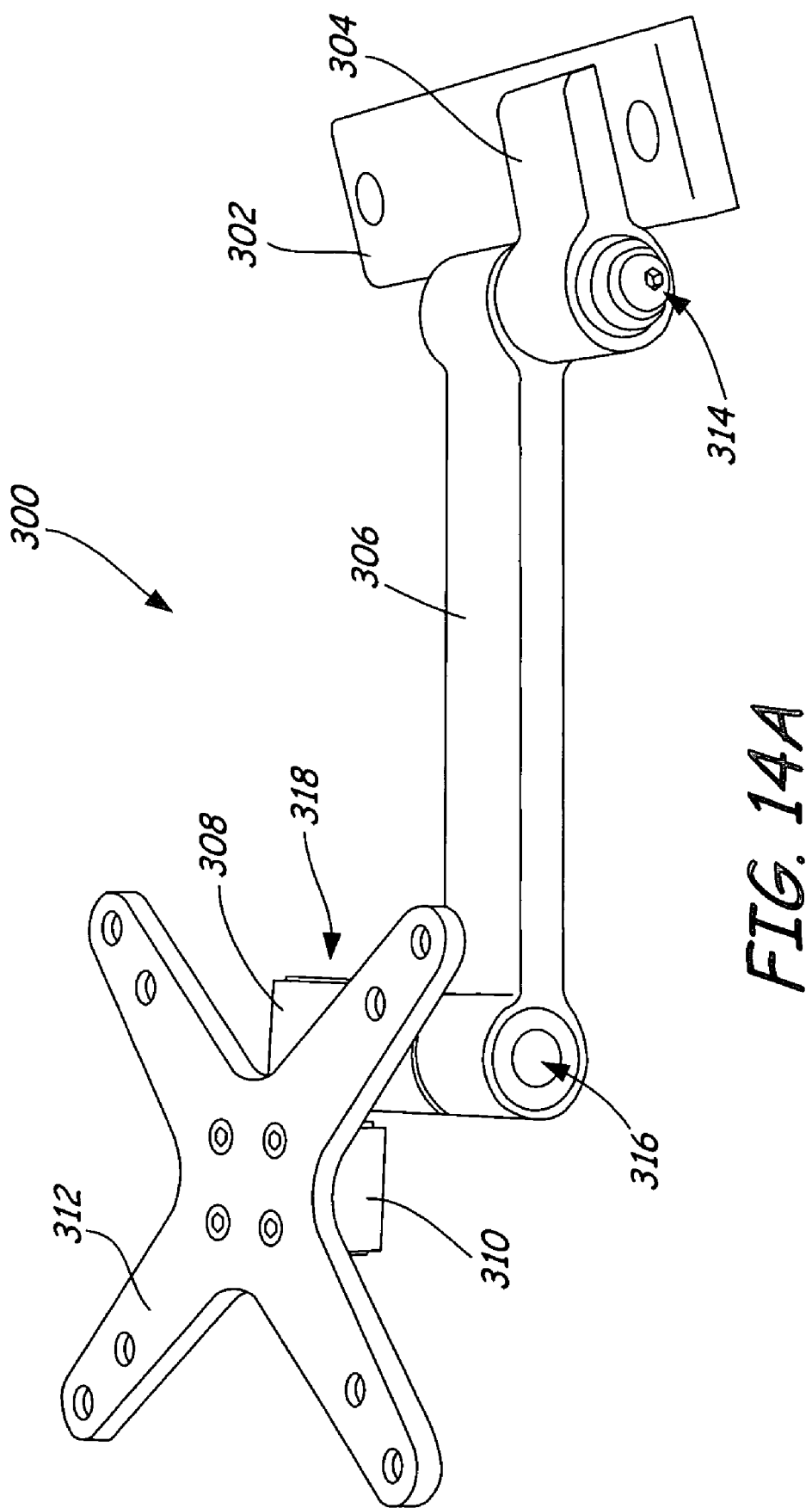
FIGS. 14A–14C show a single arm mount in accordance with the present invention.
Figure 14B:
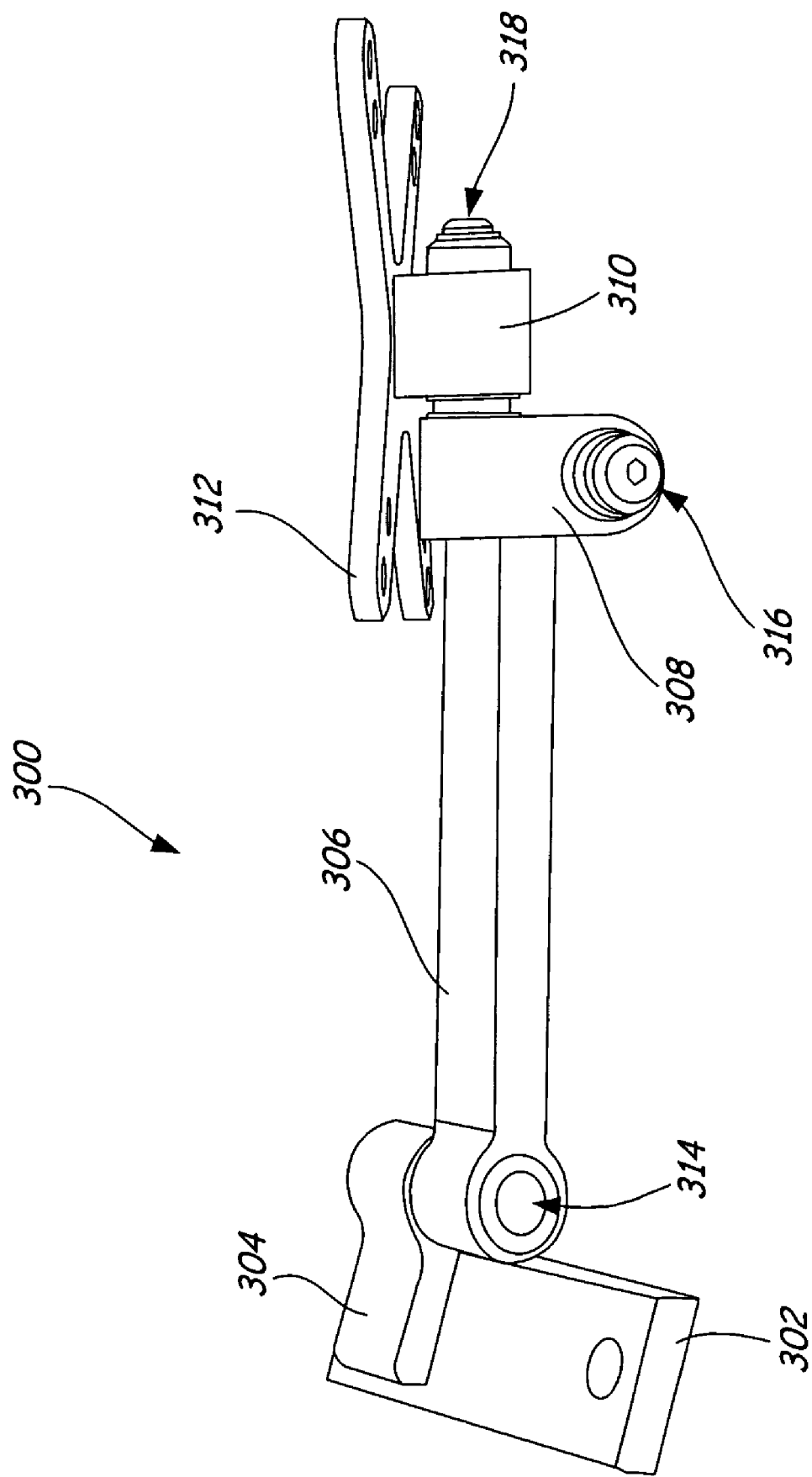
Figure 14C:
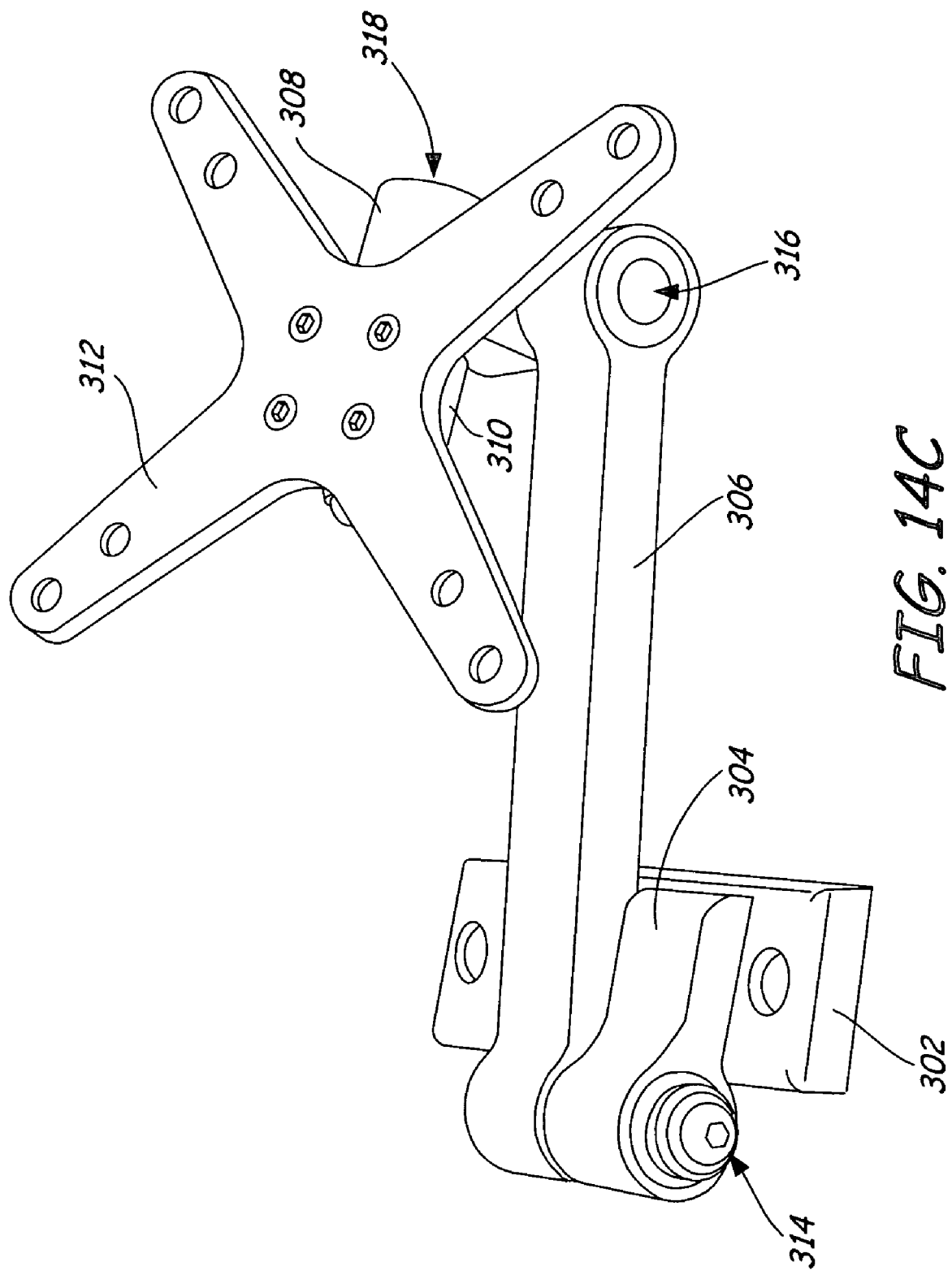

FIGS. 14A–14C show mount 300, which is a single arm embodiment of the present invention. Mount 300 includes wall plate 302, side knuckle 304, dog bone arm 306, 90° knuckle 308, solo knuckle 310, star mounting plate 312, and tapered bearings 314, 316, and 318. The construction of mount 300 is generally the same as mount 20, except that it uses one less dog bone arm, and one less tapered bearing.

Figure 14D:
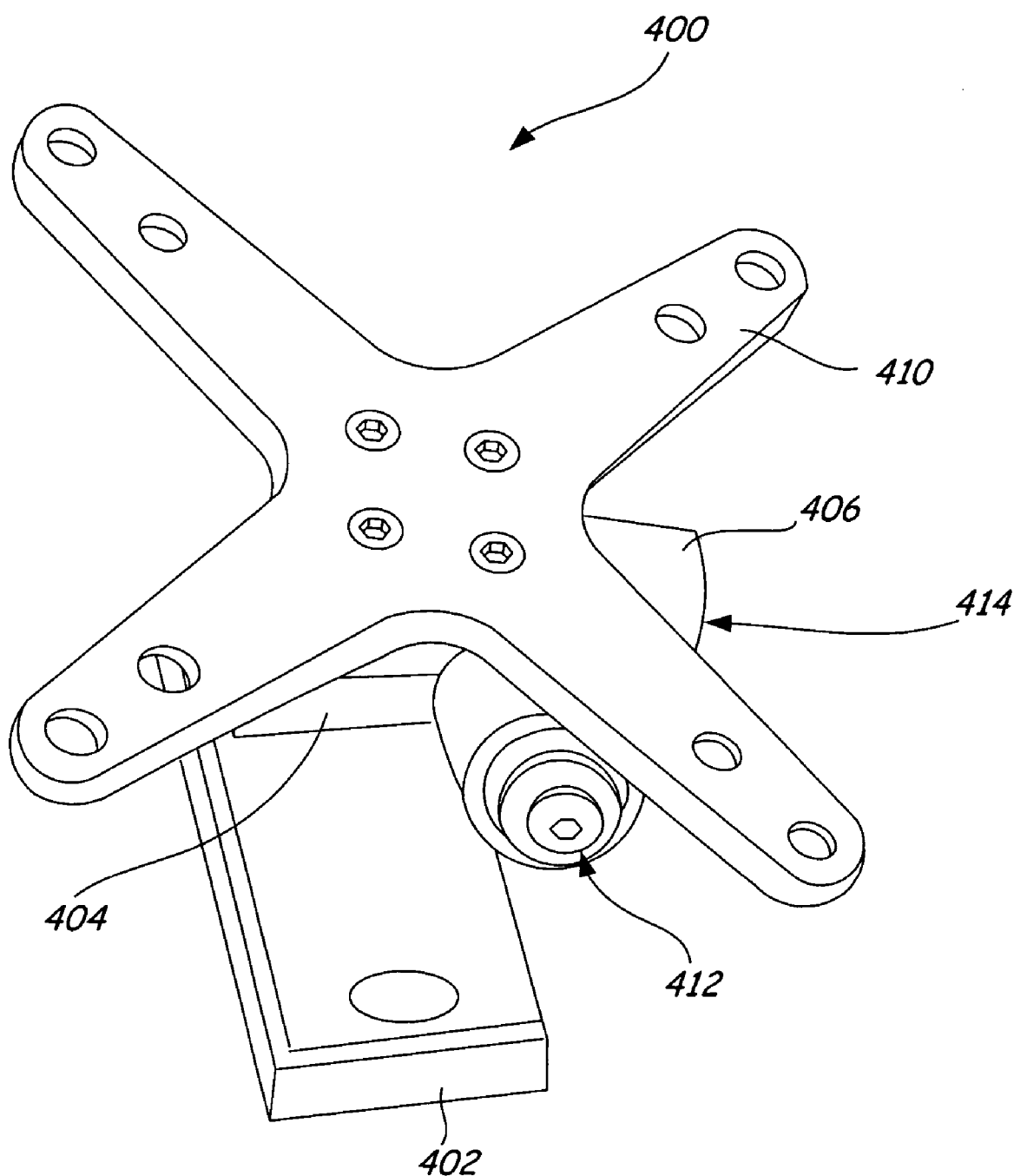
FIGS. 14D–14F show a mount using knuckles as link elements in accordance with the present invention.
Figure 14E:
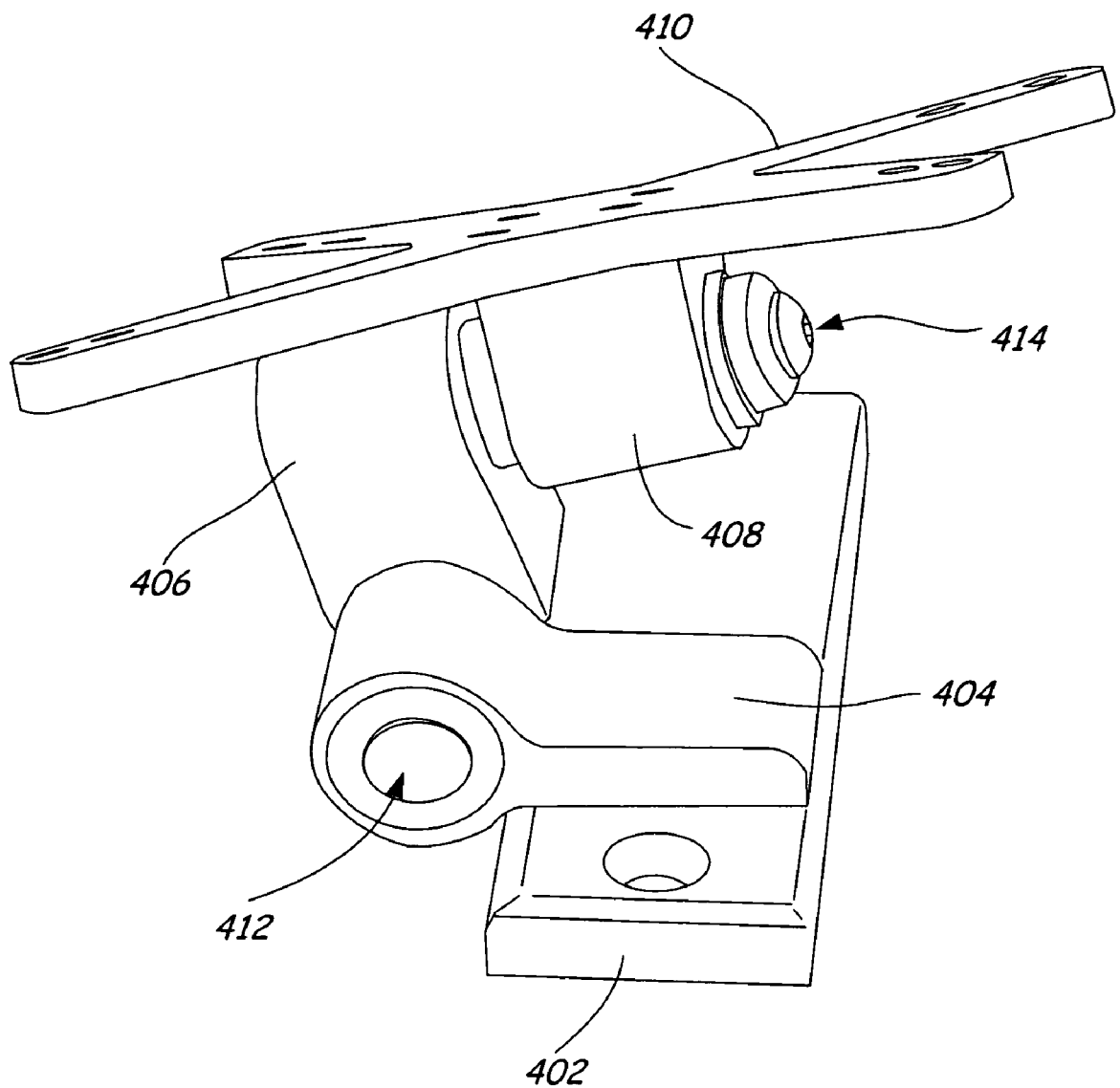
Figure 14F:
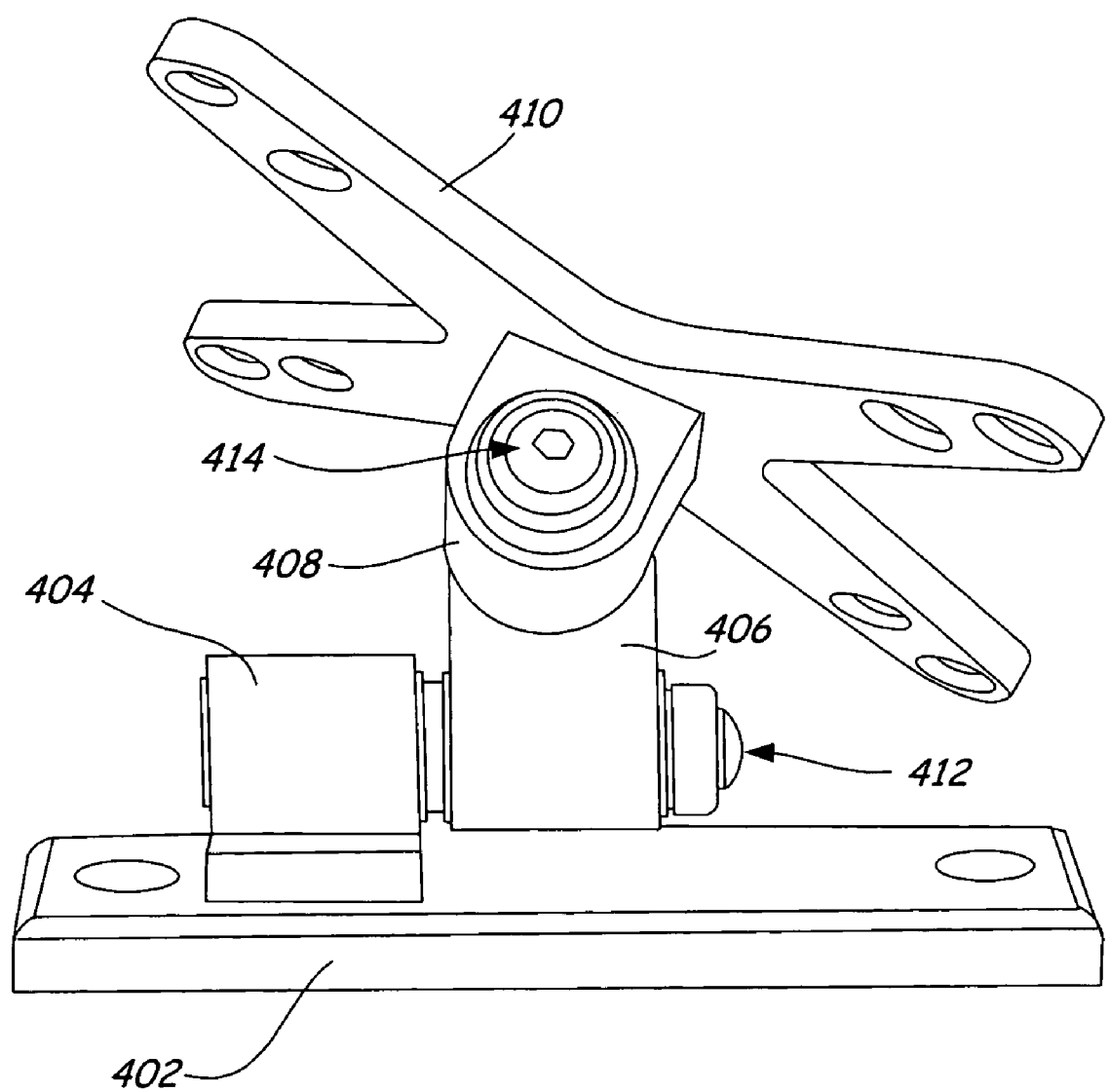

FIGS. 14D–14F show mount 400, which is similar to mounts 20 and 300, except that it uses no dog bone arms. Mount 400 includes wall plate 402, side knuckle 404, 90° knuckle 406, solo knuckle 408, mount plate 410, and tapered bearings 412 and 414.

Figure 15C:
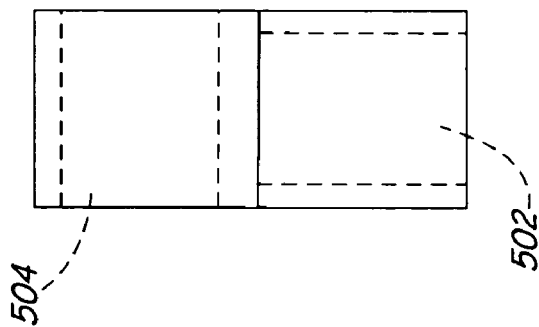
FIGS. 15A–15C show a twisted knuckle element usable in mounts in accordance with the present invention.
Figure 15A:
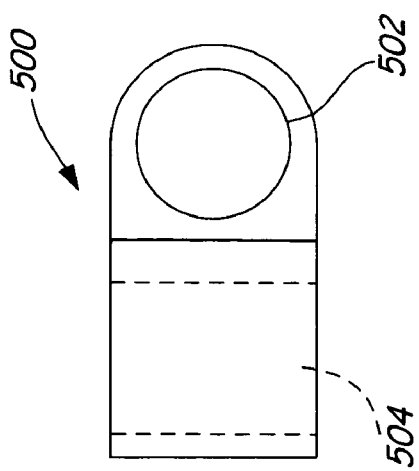
Figure 15B:
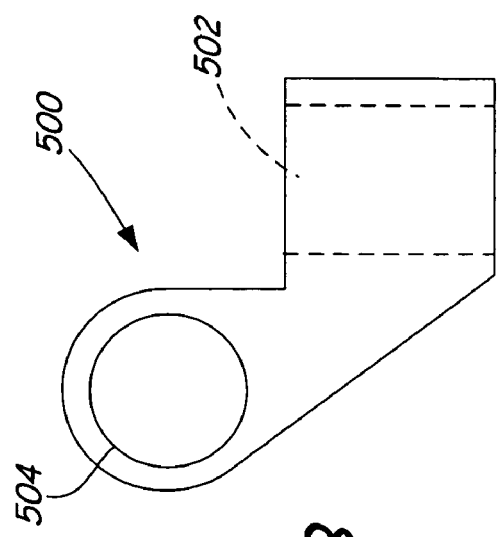
Figure 16A:
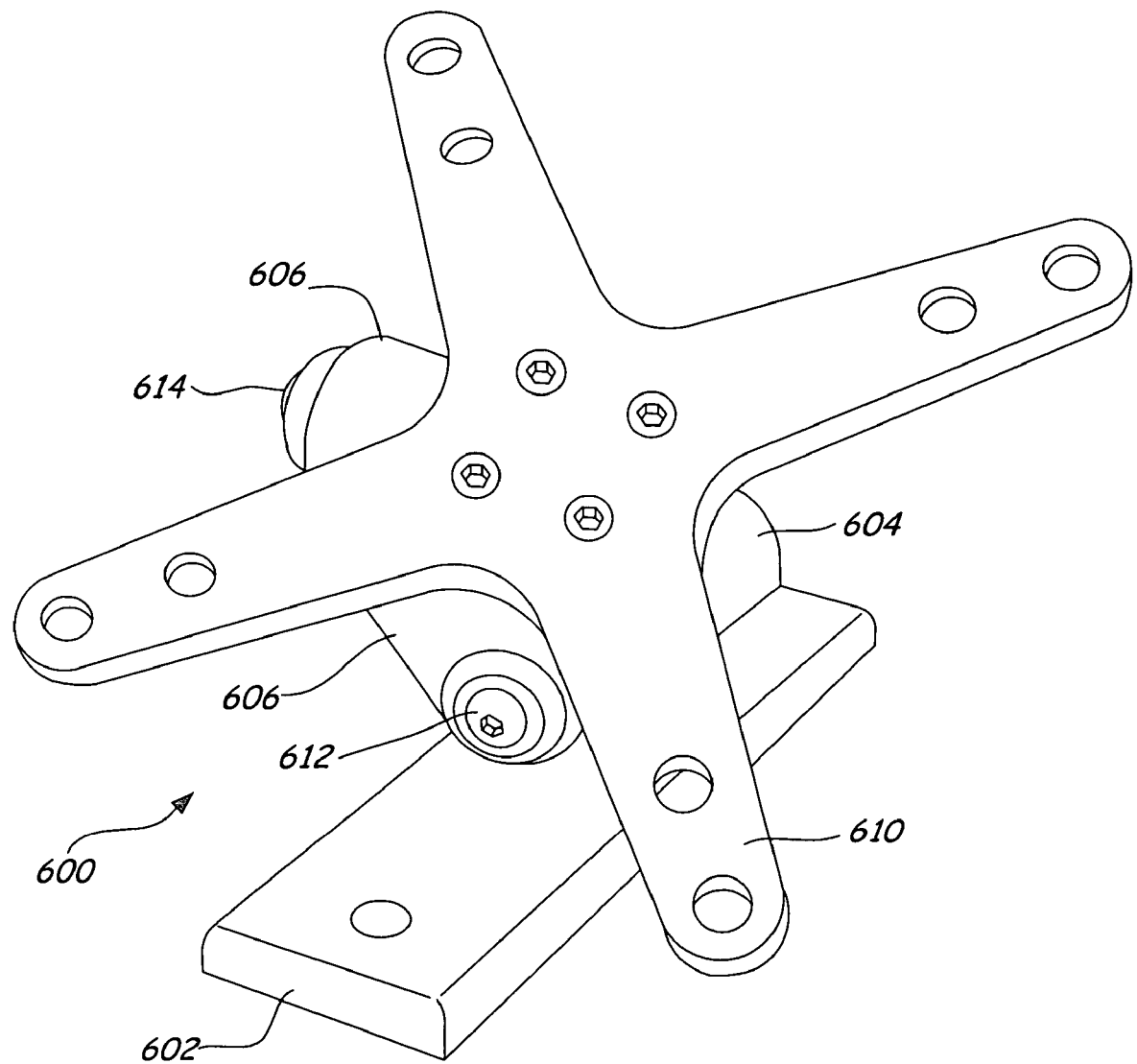
FIGS. 16A–16J show another embodiment of a mount in accordance with the present invention using the twisted knuckle element of FIGS. 15A–15C.
Figure 16B:
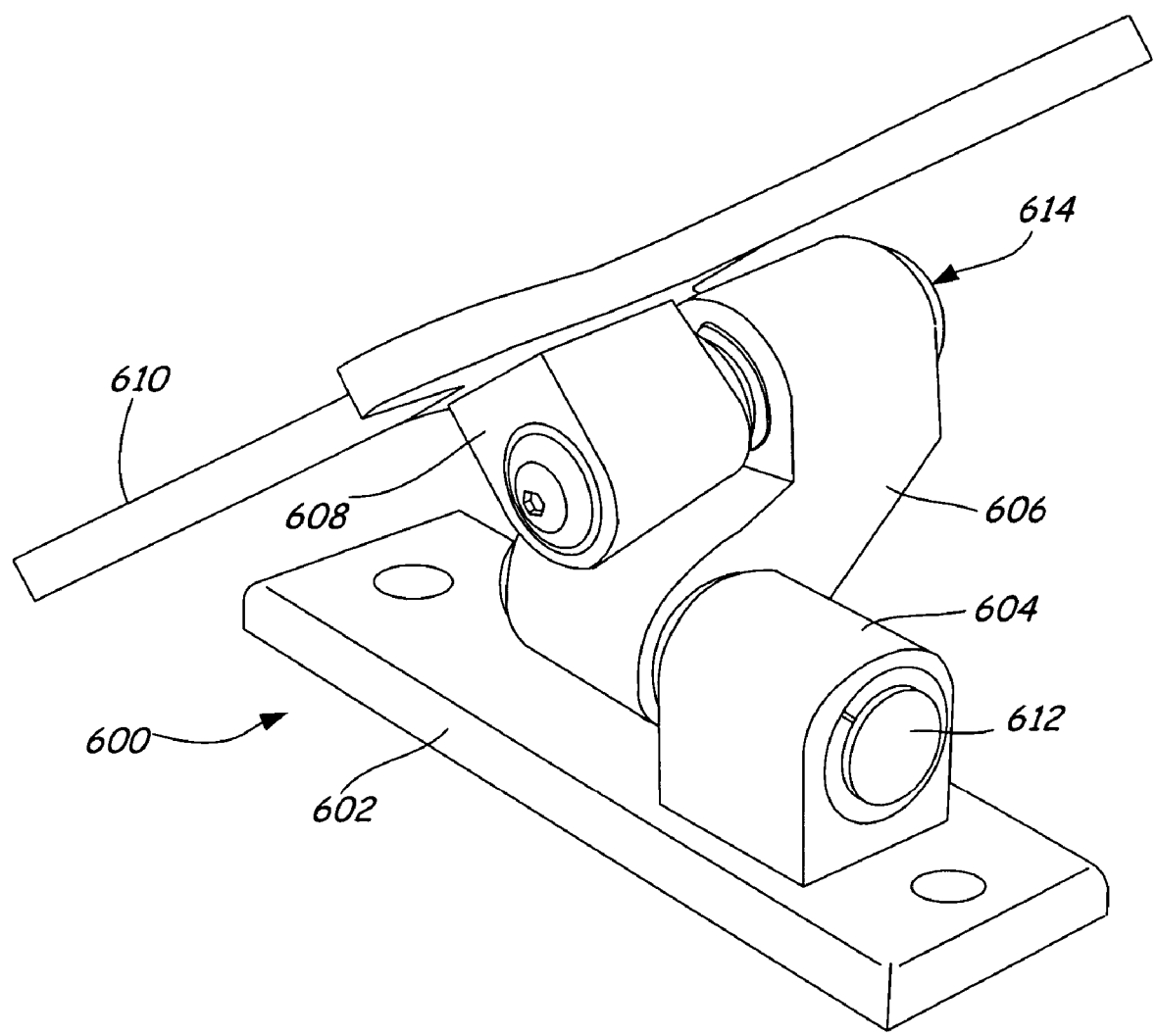
Figure 16C:
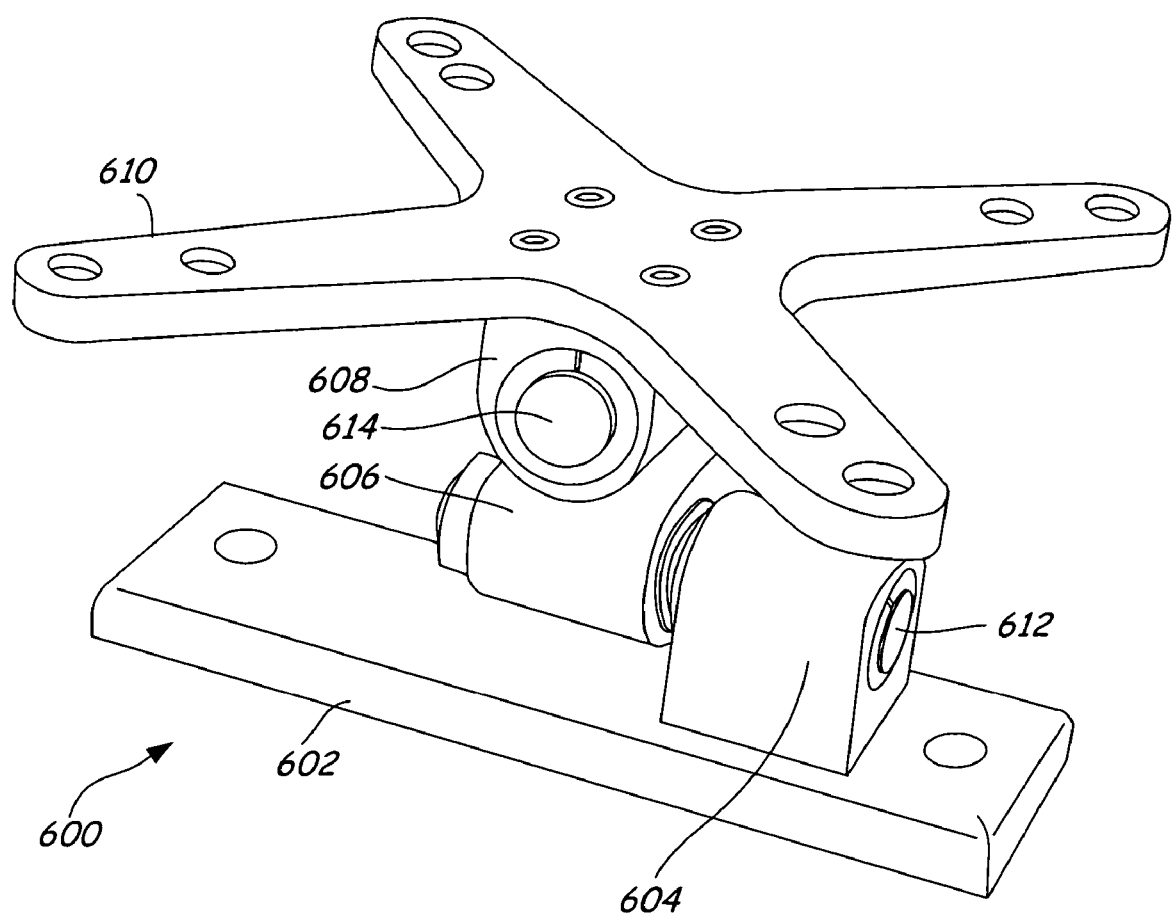
Figure 16D:
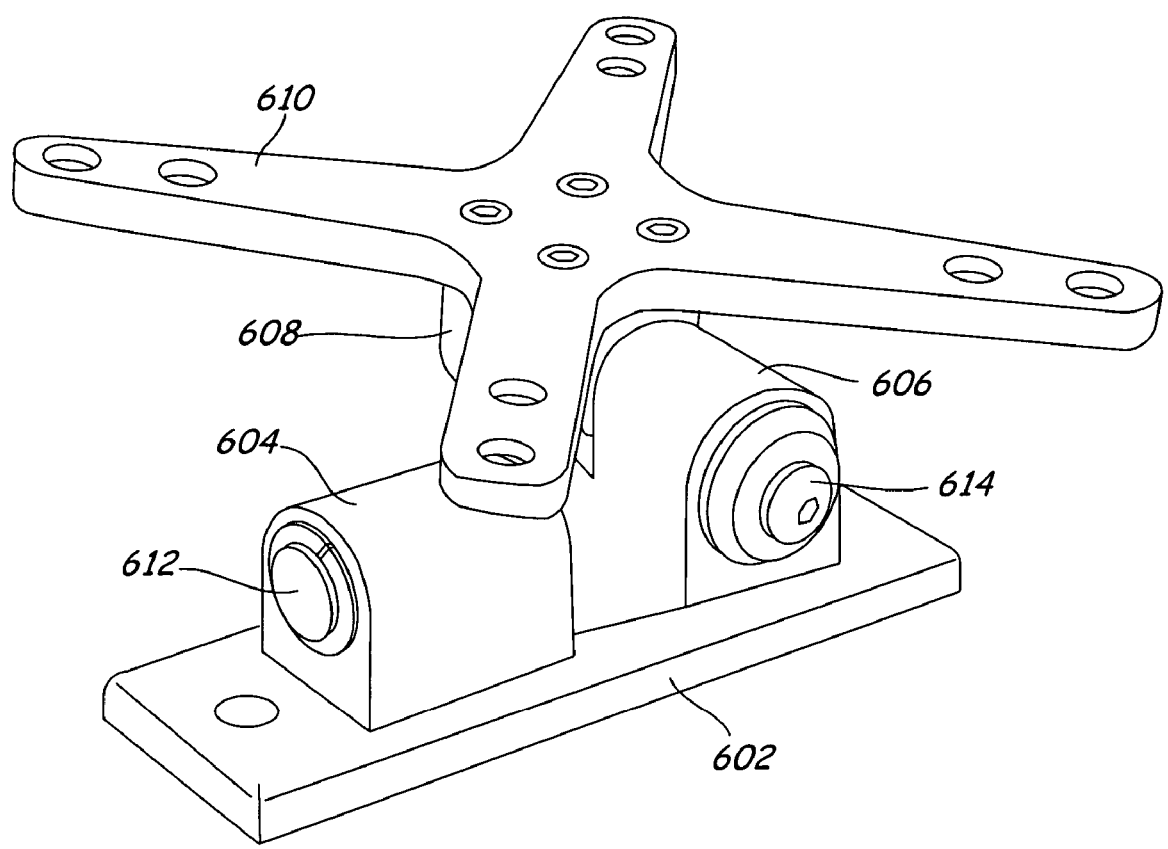
Figure 16E:
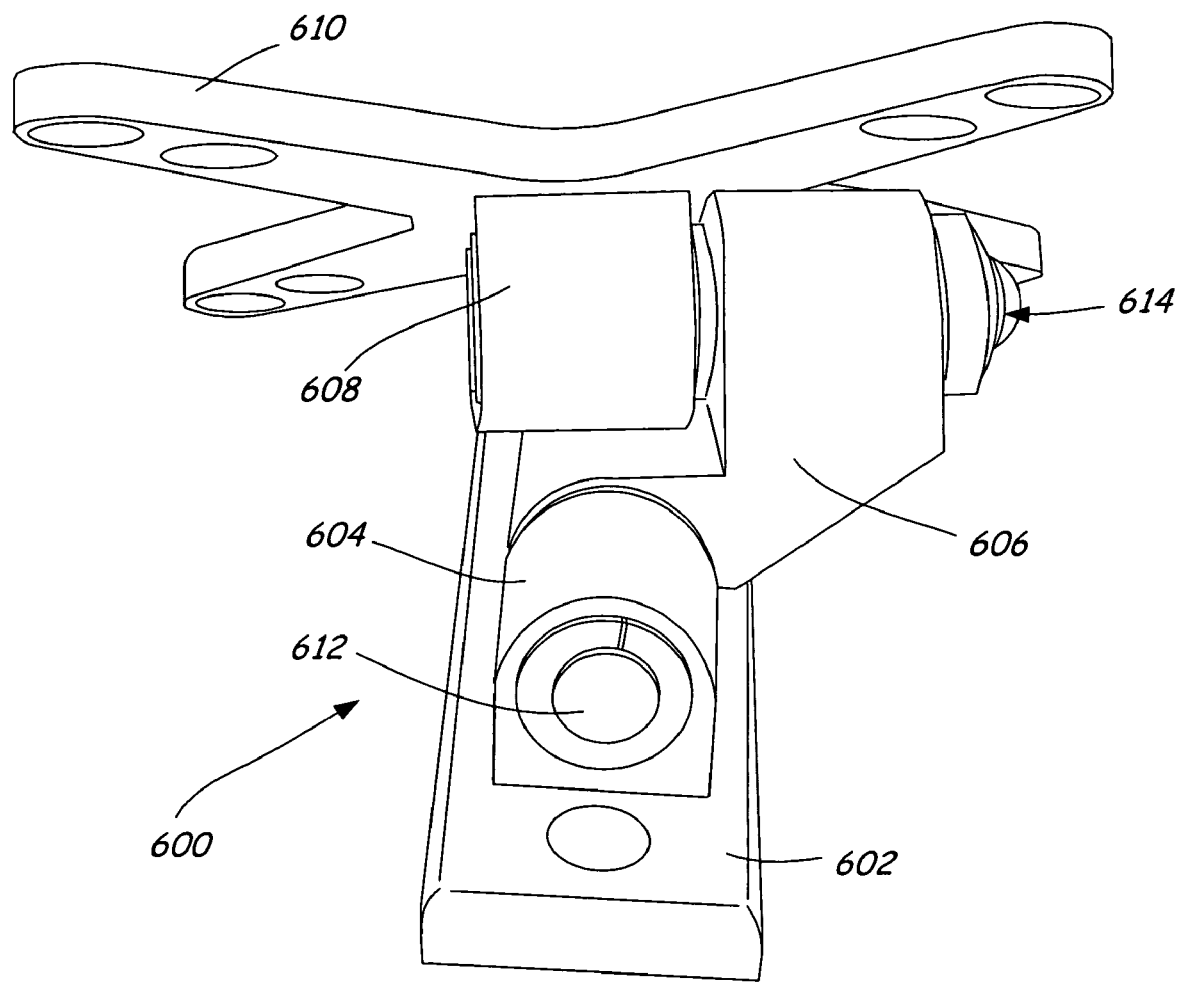
Figure 16F:
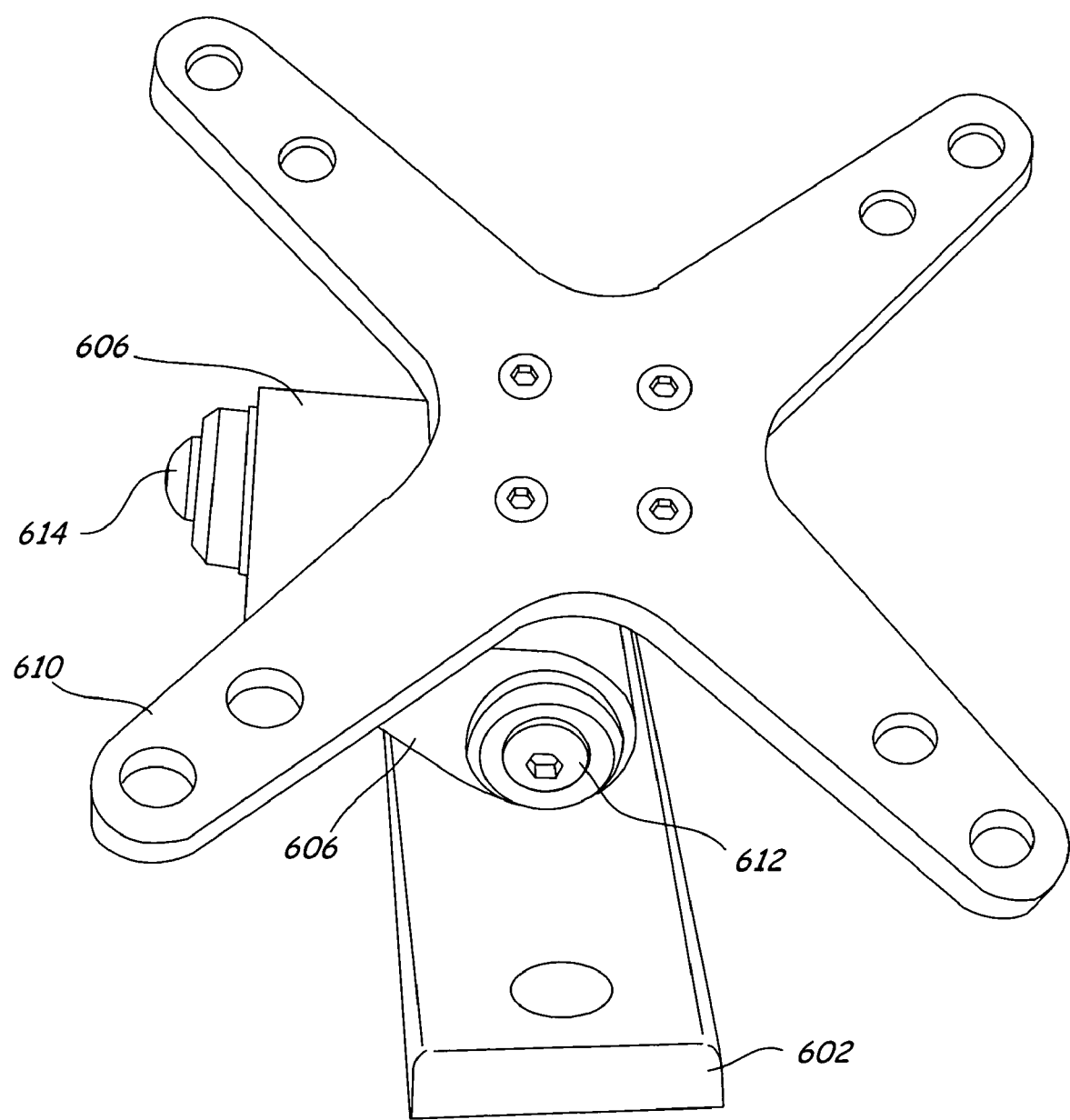
Figure 16G:
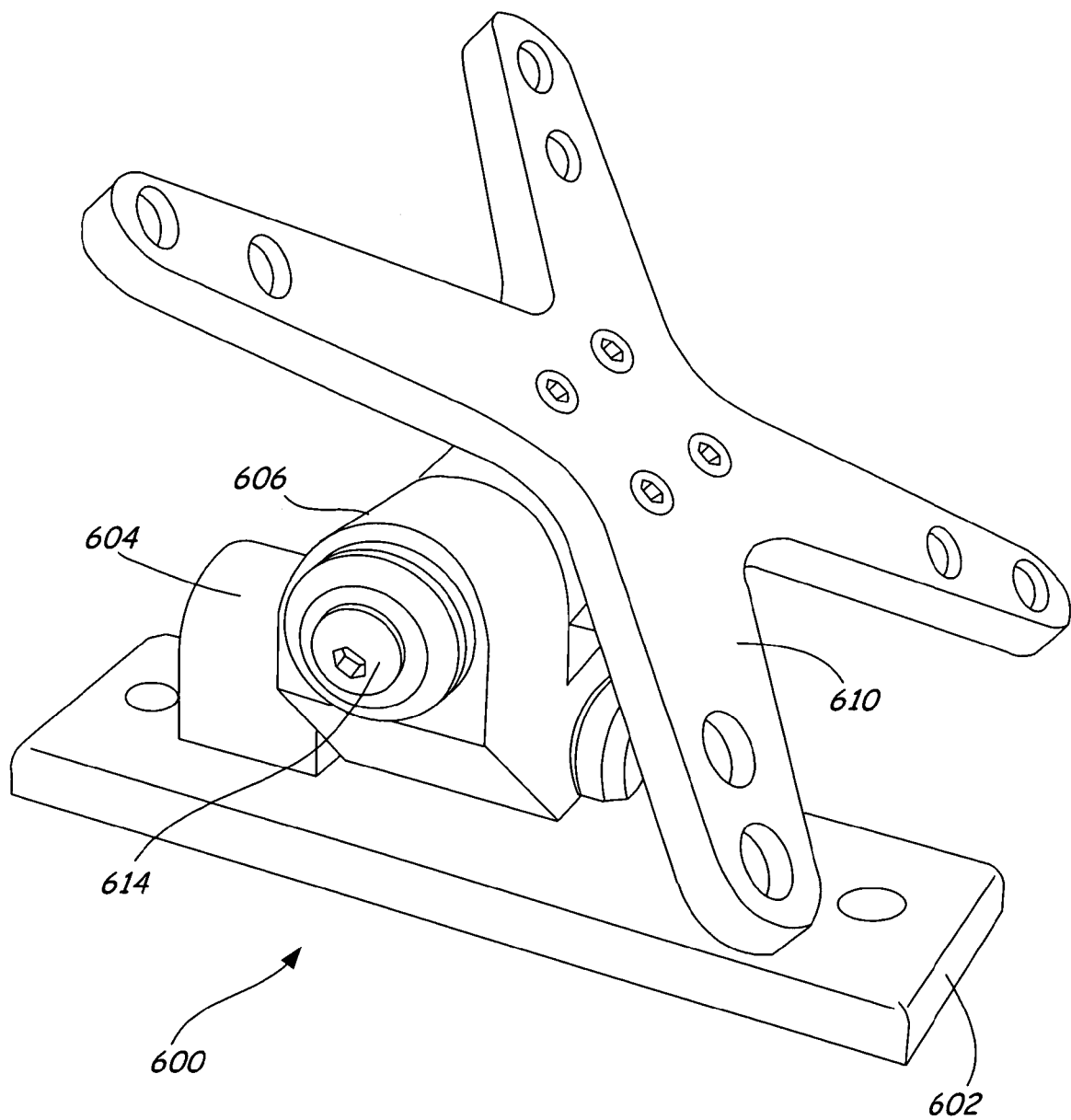
Figure 16H:
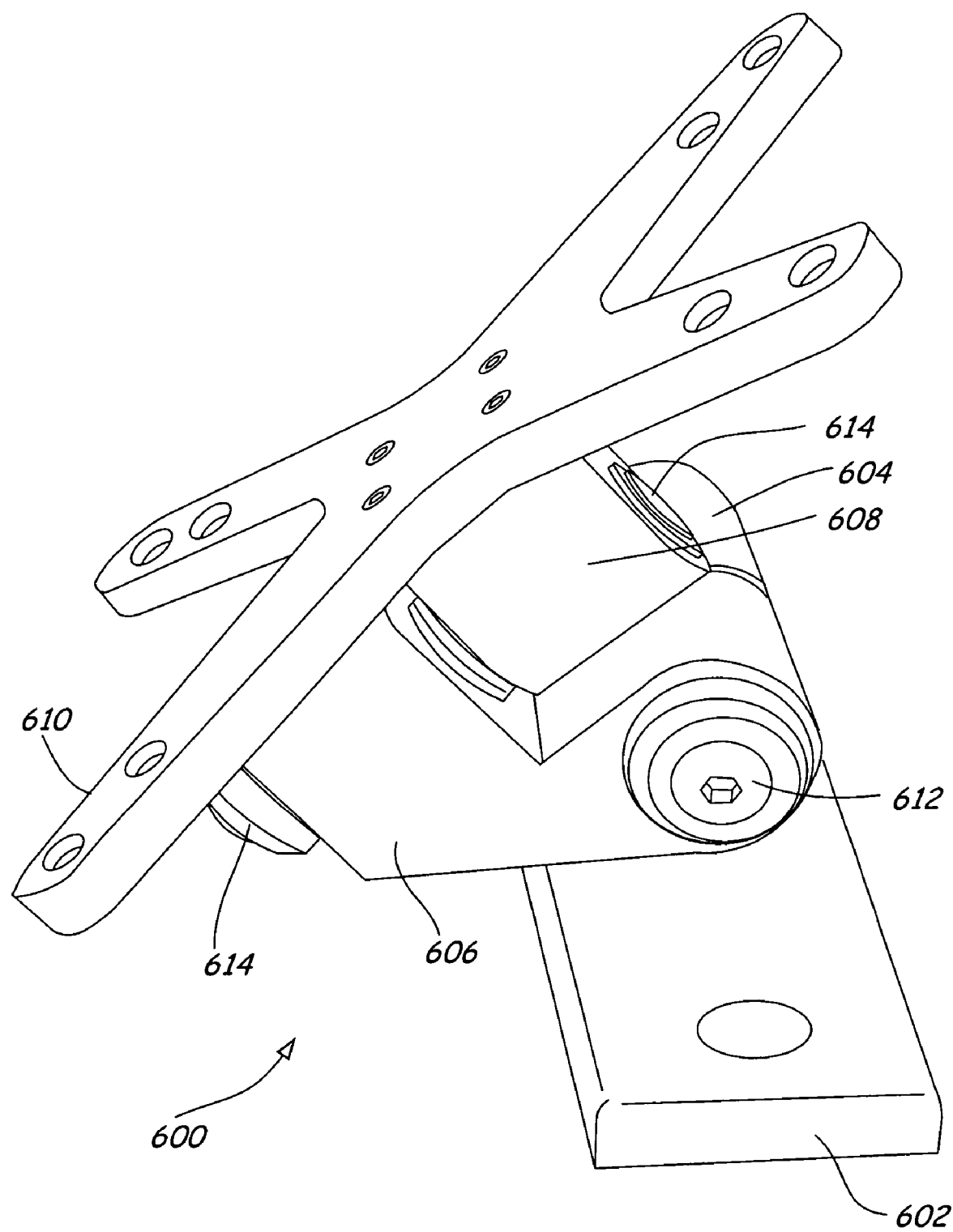
Figure 16I:
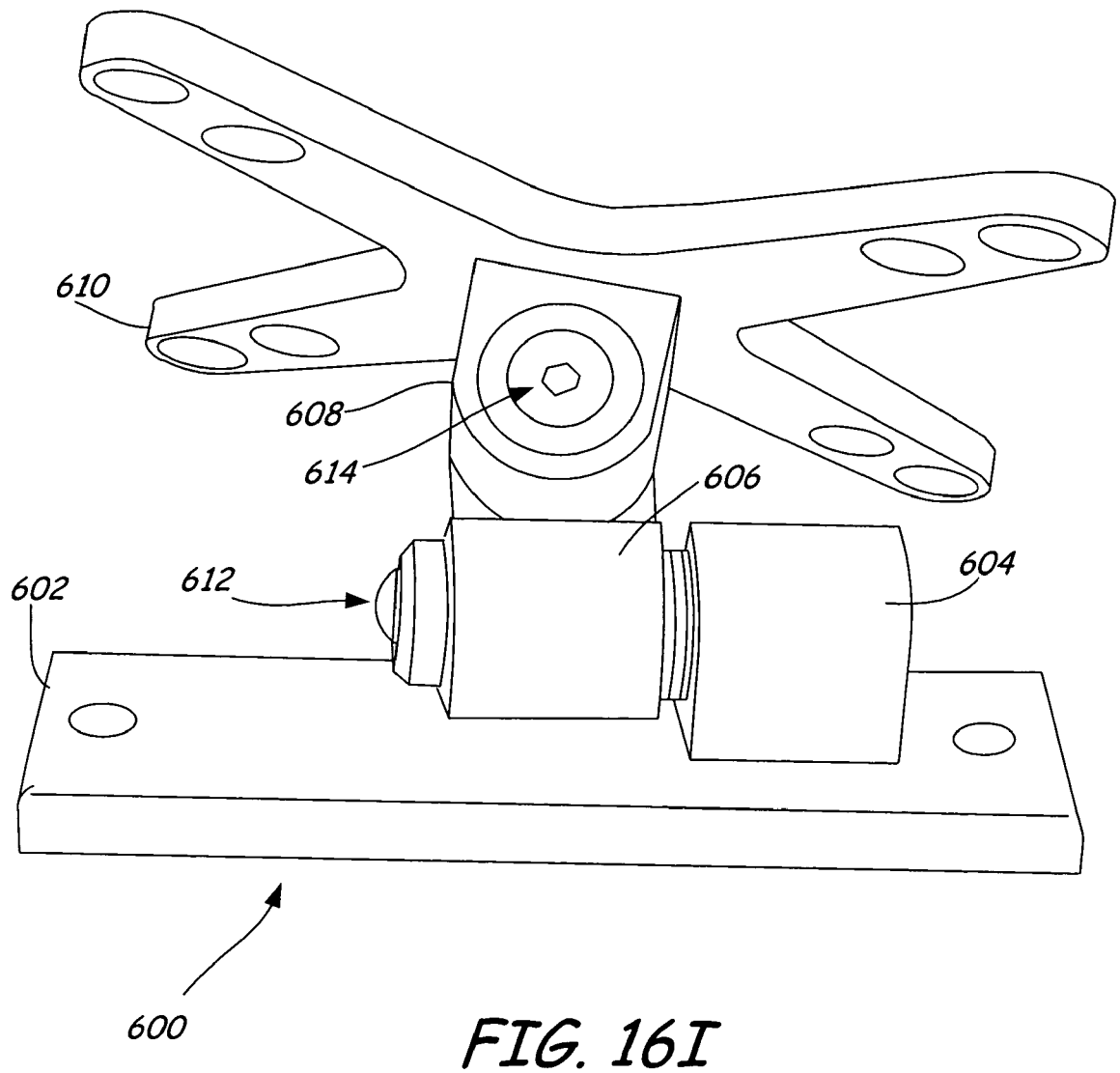
Figure 16J:
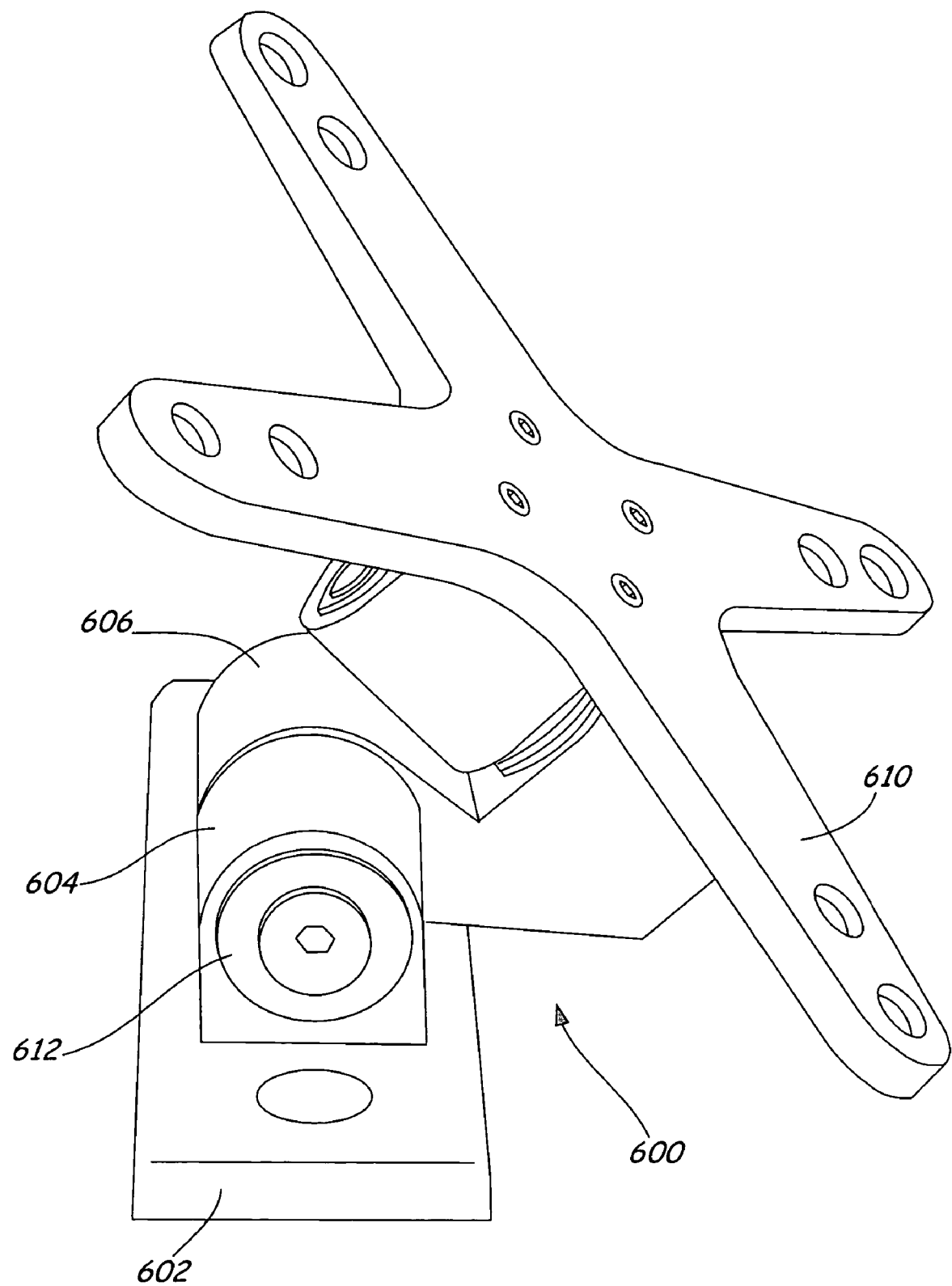

FIGS. 15A–15C show twisted knuckle 500 which provides pair of bores 502 and 504 which define pivot axes which are oriented to 90° to one another which are offset from one another. Twisted knuckle 500 can be used with the other components shown in FIGS. 2A through 7B to provide still further variations in mount configurations.

One example of a mount using twisted knuckle 500 is mount 600 shown in FIGS. 16A–16J. Mount 600 includes wall plate 602, solo knuckle 604, twisted knuckle 606, solo knuckle 608, and mounting plate 610. Tapered bearing 612 pivotally connects solo knuckle 604 to one end of twisted knuckle 606. Tapered bearing 614 connects the other end of twisted knuckle 606 to solo knuckle 608.

Figure 17C:
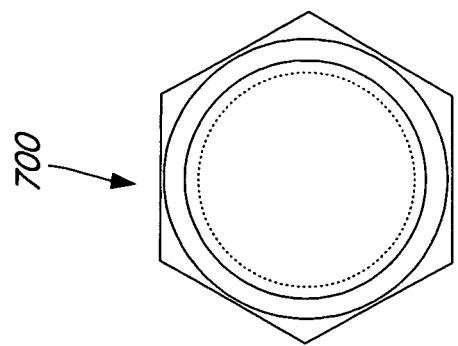
FIGS. 17A–17C show a threaded spindle useable in the present invention as an alternative to the tapered axle of FIGS. 8A–8C.
Figure 17B:
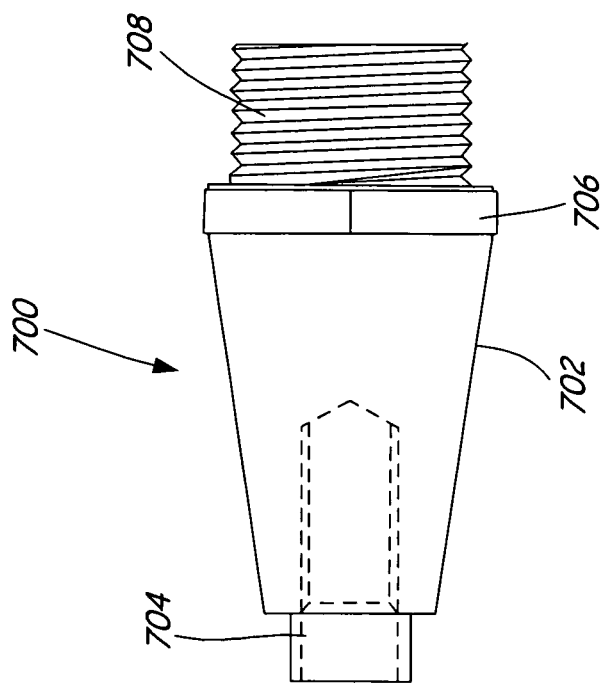
Figure 17A:
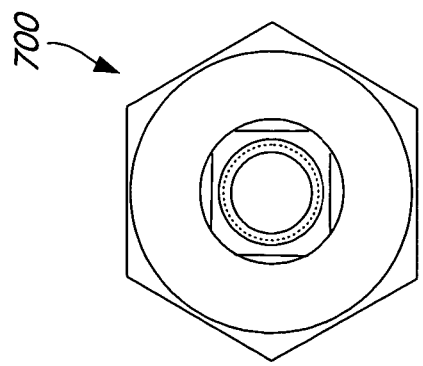

FIG. 17A–17C show tapered axle 700, which is an alternative component to tapered axle 110 shown in FIGS. 8A–8C. Axle 700 includes tapered spindle 702, square neck 704, hex nut section 706, and threaded spindle 708. Axle 700 works in essentially the same way as axle 110, except that it is secured in one of the two parts by threaded spindle 708. The use of axle 700, therefore, requires that other elements (such as dog bone arms and various knuckles) include a threaded bore into which threaded spindle 708 can be inserted.

Yet still another embodiment of the present invention, threaded spindle 708 is replaced by a knurled spindle. In this embodiment, a closely fitting bore is provided in the arms and knuckles so that a press fit between the knurled spindle and the bore is produced which secures the tapered axle in place. One advantage of using the threaded spindle or the knurled spindle is the potential of inserting a tapered axle perpendicular to the plane of the wall plate or to the plane of the mounting plate. This is achieved by providing a bore which is either threaded or is sized for press fit depending upon whether a threaded spindle or knurled spindle is a part of the tapered axle. Additional degrees of freedom of movement can be provided in this way.

FIGS. 18A, 18B, 19A, 19B, and 20A–20D show various embodiments using axle 700 as part of a mounting system. In these drawings, axle 700 is shown in solid lines rather than in phantom for ease of viewing.

FIGS. 18A and 18B show double arm mount 750, which uses five tapered bearings 766, 768, 780, 782 and 784. Mount 750 includes wall plate 752, operably connected to 90° knuckle 754, through tapered bearing 766, 90° knuckle 754 operably connected to dogbone arm 756 through tapered bearing 768, dogbone arm 756, operably connected to dogbone arm 758 through tapered bearing 780, dogbone arm 758 operably connected to 90° knuckle 760, through tapered bearing 782, 90° knuckle 760 operably connected to solo knuckle 762, through tapered bearing 784, and solo knuckle 762 fixed to mounting plate 764. These components are pivotally linked by tapered bearings 766, 768, 780, 782, and 784 each disposed in tapered axles 700.

Figure 19A:
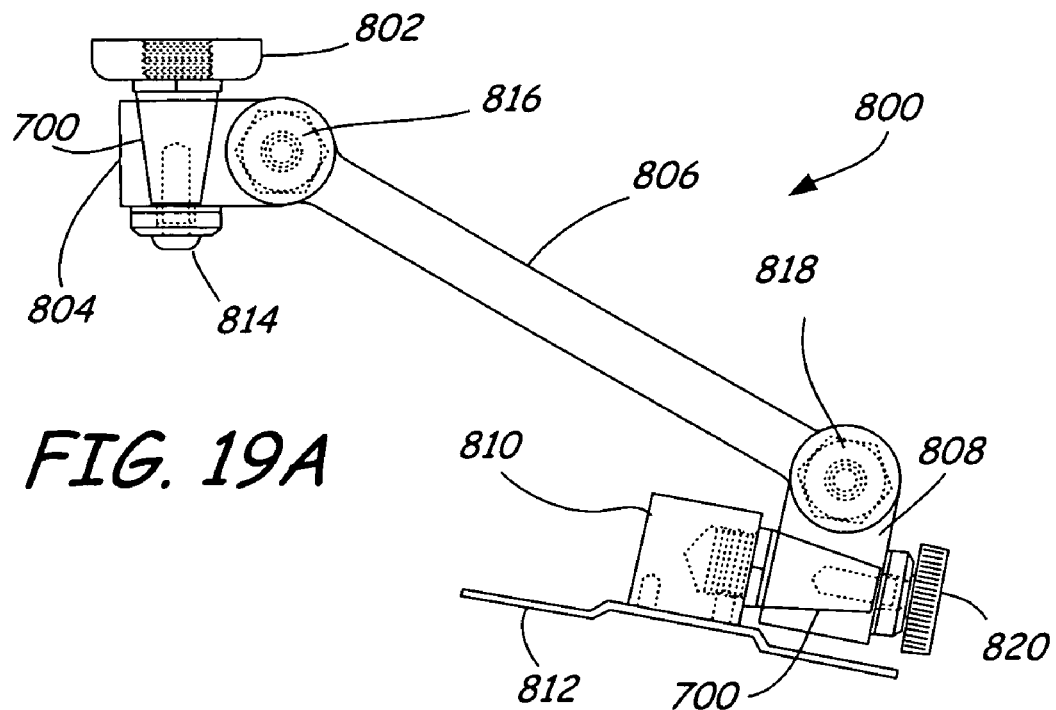
FIGS. 19A and 19B show a single arm mount using the threaded spindle.
Figure 19B:
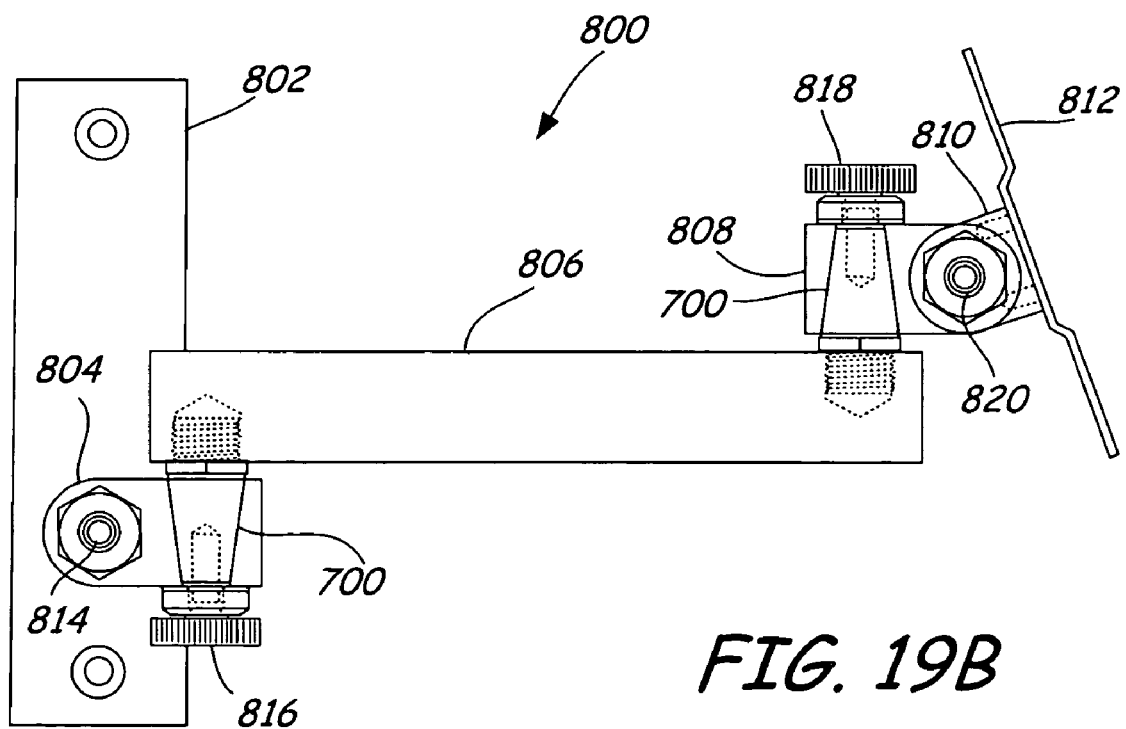
Figure 20A:
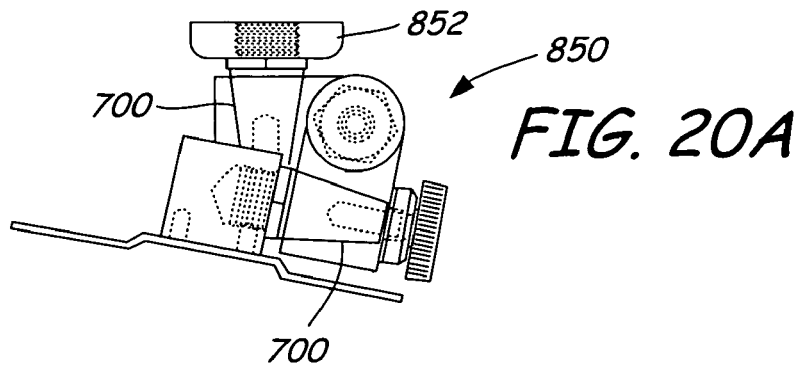
FIGS. 20A–20D show a mount using only knuckles and using the threaded spindle.
Figure 20B:
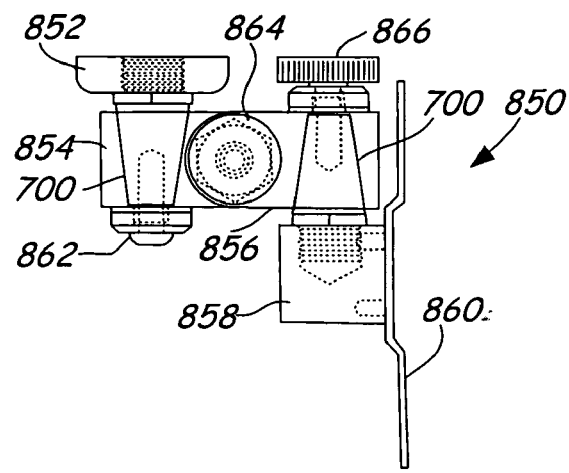
Figure 20C:
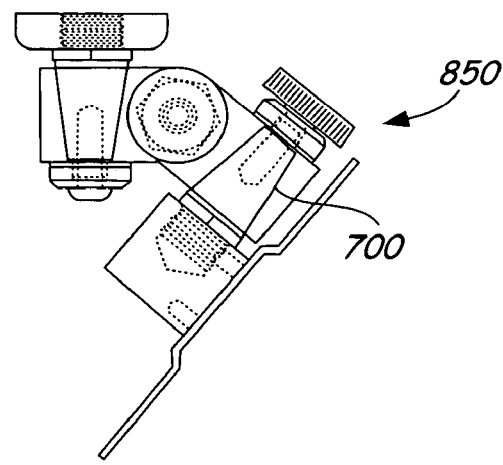
Figure 20D:
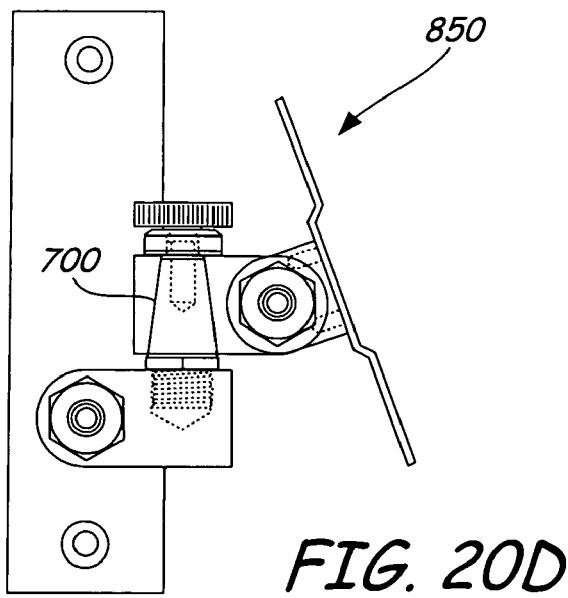

FIGS. 19A and 19B show single arm mount 800. The elements of mount 800 include wall plate 802, 90° knuckle 804, dog bone arm 806, 90° knuckle 808, solo knuckle 810, and mount plate 812. The elements are pivotally linked together by adjustable tapered bearings 814, 816, 818, and 820.

FIGS. 20A–20D show an adjustable mount 850 which does not use arms. Mount 850 includes wall plate 852, 90° knuckle 854, 90° knuckle 856, solo knuckle 858, and mount plate 860. The components are connected together by three adjustable drag tapered bearings 862, 864, and 866.

In conclusion, the mounting system of the present invention provides a wide range of different adjustable angles for a display such as a flat panel computer monitor or television. As many or as few components as are needed to get the necessary displacement and angular adjustment can be used in accordance with the invention. Selectable drag provided by adjustable drag tapered bearings allows easy movement of the links or elements of the support, and offers the ability to lock the elements in place when the desired position of the display has been obtained.

Although the present invention has been described with reference to preferred embodiments, workers skilled in the art will recognize that changes may be made in form and detail without departing from the spirit and scope of the invention.

The invention claimed is:

1. A mounting system comprising:
   a wall plate for mounting to a support surface;
   a mount plate for mounting to a display; and
   an articulated linkage between the wall plate and the mount plate including an adjustable drag tapered bearing for providing selectable drag pivotal movement about a first pivot axis, wherein the adjustable drag tapered bearing comprises:
   a tapered bore carried by a first support element of the articulated linkage; and
   a tapered axle carried by a second support element, wherein the tapered axle includes a tapered spindle that is received within and contacts the tapered bore, the tapered axle further including a tapered mount clamped into a tapered bore of the second support element, wherein the tapered spindle includes a top having a squared neck and a threaded receiver; and
   an adjustment mechanism that is adjustably secured to the tapered spindle of the tapered axle to adjust the compression between the tapered bore and the tapered spindle.

2. The system of claim 1, wherein the articulated linkage further includes a second adjustable drag tapered bearing providing a selectable drag pivotal movement about a second pivot axis displaced from the first pivot axis.

3. The system of claim 1, wherein the compression between the tapered bore and the tapered spindle as established by the adjustment mechanism is independent of rotation of the first and second support elements.

4. The system of claim 1, wherein the tapered bore is part of a bushing carried by the first support element.

5. The system of claim 1 wherein;
   the tapered spindle of the tapered axle further includes a threaded base;

the second support element of the articulated linkage carries a threaded bore; and the threaded base of the tapered spindle is screwed into the threaded bore of the second support element.

6. The system of claim 1, wherein the tapered bore is formed in the first support element.

7. The system of claim 1, wherein the first support element comprises a first support arm and the tapered bore is carried by the first support arm.

8. The system of claim 1, wherein the second support element comprises a second support arm and the tapered axle is carried by the second support arm.

9. The system of claim 1, wherein the adjustment mechanism further comprises:

a tension cap having a top, a base, a through hole, and a squared counter bore that mates with the squared neck on the tapered spindle;

a washer having an aperture large enough to clear the squared neck on the tapered spindle such that the washer is captured between the base of the tension cap and the tapered bore; and a drag adjustment screw having a head and a stem, wherein the head contacts the top of the tension cap and the stem extends through the through hole of the tension cap and the washer and is secured to the tapered spindle such that the drag adjustment screw provides adjustable compression between the tapered bore of the first support element and the tapered spindle of the second support element independent of rotation of the first and second support elements.

10. A mounting system comprising:

a wall plate for mounting to a support surface;

a mount plate for mounting to a display; and an articulated linkage between the wall plate and the mount plate comprising an adjustable drag tapered bearing for providing a selectable drag pivotal movement about a first pivot axis and a support element, wherein the adjustable drag tapered bearing comprises:

a tapered bore formed in a first support element, the tapered bore presenting an inwardly facing tapered surface;

a tapered axle carried by a second support element, wherein the tapered axle includes a tapered spindle, the tapered spindle presenting an outwardly facing tapered surface, the tapered axle rotatably disposed in the tapered bore such that the outwardly facing tapered surface of the tapered spindle frictionally engages the inwardly facing tapered surface of the tapered bore; and a friction adjustment mechanism operably coupled with the tapered spindle and arranged to selectively shift the tapered spindle axially within the tapered bore to enable selective adjustment of a magnitude of friction between the outwardly facing tapered surface of the tapered spindle and the inwardly facing tapered surface of the tapered bore.

11. The system of claim 10, wherein the friction adjustment mechanism is independent of rotation of the first and second support elements.

12. The system of claim 10, wherein the articulated linkage further includes a second adjustable drag tapered bearing providing selectable drag pivotal movement about a second pivot axis displaced from the first pivot axis.

13. The system of claim 10, wherein the friction adjustment mechanism comprises:

a squared neck protruding from a top surface of the tapered spindle;

a tension cap having a top, a base, a through hole, and a squared counter bore for mating with the squared neck on the tapered spindle;

a washer having an aperture large enough to clear the squared neck on the tapered spindle and which is captured between the tension cap and the tapered bore carried by the first support element; and a drag adjustment fastener having a head that contacts the top of the tension cap and a stem that extends through the tension cap and the washer and is received by the tapered spindle, wherein the drag adjustment fastener provides adjustable compression between the tapered bore of the first support element and the tapered spindle of the second support element independent of rotation of the first and second support elements.

14. The system of claim 13, wherein the tapered spindle further includes a threaded receiver.

15. The system of claim 14, wherein the drag adjustment fastener is a screw that threads into the threaded receiver of the tapered spindle to provide adjustable compression between the tapered bore and the tapered spindle.

16. The system of claim 10, wherein the tapered spindle is secured to a threaded spindle that is carried by a threaded bore of the second support element.

17. The system of claim 10, wherein the friction adjustment mechanism is a screw.

18. The system of claim 10, wherein the first support element comprises a first support arm and the tapered bore is formed in the first support arm.

19. The system of claim 10, wherein the second support element comprises a second support arm and the tapered spindle is carried by the second support arm.

20. A mounting system comprising:

a wall plate for mounting to a support surface;

a mount plate for mounting to a display; and an articulated linkage between the wall plate and the mount plate including a first adjustable drag tapered bearing, for providing selectable drag pivotal movement about a first pivot axis, wherein the first adjustable drag tapered bearing comprises:

a tapered bore carried by a first support element of the articulated linkage;

a tapered axle carried by a second support element, wherein the tapered axle includes a tapered spindle;

a drag adjustment screw extending from the tapered spindle;

a tension cap having a through hole, wherein the drag adjustment screw extends through the first support element and the through hole;

a fastener for engaging the drag adjustment screw and adjustably compressing the tension cap and the first support element by adjusting the relative position of the fastener to the tapered spindle thereby providing adjustable compression between the tapered spindle and the tapered bore.

21. The mounting system of claim 20 wherein the fastener is secured to a top end of the drag adjustment screw and the drag adjustment screw is turned into a threaded receiver carried by the tapered spindle such that as the drag adjustment screw is turned into or out of the threaded receiver the tension cap either increases or releases pressure, respectively, between the tapered spindle and the tapered bore to vary and select the drag therebetween.

* * * * *